(12) United States Patent
Sugiyama et al.

(10) Patent No.: US 8,547,618 B2
(45) Date of Patent: Oct. 1, 2013

(54) BEAM SCANNING DISPLAY APPARATUS

(75) Inventors: Keiji Sugiyama, Kyoto (JP); Kakuya Yamamoto, Hyogo (JP); Tatsuo Itoh, Osaka (JP); Kenichi Kasazumi, Osaka (JP); Akira Kurozuka, Osaka (JP)

(73) Assignee: Panasonic Corporation, Osaka (JP)

( * ) Notice: Subject to any disclaimer, the term of this patent is extended or adjusted under 35 U.S.C. 154(b) by 459 days.

(21) Appl. No.: 13/000,132

(22) PCT Filed: Apr. 6, 2010

(86) PCT No.: PCT/JP2010/002516
§ 371 (c)(1),
(2), (4) Date: Dec. 20, 2010

(87) PCT Pub. No.: WO2010/116726
PCT Pub. Date: Oct. 14, 2010

(65) Prior Publication Data
US 2011/0102874 A1    May 5, 2011

(30) Foreign Application Priority Data
Apr. 9, 2009   (JP) ................. 2009-094790

(51) Int. Cl.
*G02B 26/08* (2006.01)
(52) U.S. Cl.
USPC ............... 359/205.1; 359/207.2; 359/207.5; 359/210.1; 345/8

(58) Field of Classification Search
USPC ............... 359/13–15, 630–633, 205.1–207.6; 353/7, 28; 345/7–9
See application file for complete search history.

(56) References Cited

U.S. PATENT DOCUMENTS

| 2005/0234348 A1 | 10/2005 | Watanabe et al. |
| 2006/0139718 A1 | 6/2006 | Ishihara |
| 2009/0316115 A1 * | 12/2009 | Itoh et al. ........................ 353/20 |

FOREIGN PATENT DOCUMENTS

| JP | 61-124930 | 6/1986 |
| JP | 10-301055 | 11/1998 |
| JP | 2004-191946 | 7/2004 |
| JP | 2006-178346 | 7/2006 |

OTHER PUBLICATIONS

International Search Report issued May 11, 2010 in International (PCT) Application No. PCT/JP2010/002516.

\* cited by examiner

*Primary Examiner* — James Phan
(74) *Attorney, Agent, or Firm* — Wenderoth, Lind & Ponack, L.L.P.

(57) ABSTRACT

A scanning type image display apparatus includes a light source unit for emitting a laser beam, a scanning mirror for scanning the laser beam two-dimensionally in a first direction and a second direction that intersects the first direction, and a control unit for controlling driving of the scanning mirror. The control unit drives the scanning mirror such that a scanning frequency in the first direction is higher than a scanning frequency in the second direction, and varies a scanning amplitude in the first direction by varying the scanning frequency in the first direction in synchronization with a period of the scanning frequency in the second direction.

17 Claims, 22 Drawing Sheets

BEAM SCANNING DISPLAY APPARATUS

TECHNICAL FIELD

The present invention relates to a beam scanning display apparatus such as an HMD (Head Mounted Display) or an HUD (Head Up Display).

BACKGROUND ART

In a conventional display apparatus such as an HMD (Head Mounted Display), a system (to be referred to hereafter as a beam scanning system) of scanning a laser beam two-dimensionally and drawing the scanned laser beam directly onto a retina of an eye may be employed (see Patent Document 1, for example). A display apparatus used in the beam scanning system is known as a retinal scanning display, a retinal irradiation display, a retina direct drawing display, a beam scanning display, a direct vision display apparatus, an RSD (Retinal Scanning Display), a VRD (Virtual Retinal Display), and so on.

FIGS. 1A and 1B show a constitutional example of an eyeglass-type HMD. As shown in FIGS. 1A and 1B, the eyeglass-type HMD includes laser light sources 101/110 carried on an eyeglass frame to emit laser beams, wavefront shape modification units 102/109 for controlling wavefronts of the laser beams, and scanning units 103/108 for scanning the laser beams in a two-dimensional direction.

The laser beams emitted from the laser light sources 101/110 are projected toward eyeglass lenses by the scanning units 103/108. The laser beams are then reflected by deflecting units 104/107 provided on surfaces of the eyeglass lenses so as to enter the eyes of a user and form an image on retinas. A half-mirror, an HOE (Holographic Optical Element), or similar is used as the deflecting units 104/107. Thus, the deflecting units 104/107 allow the user to see both an outside view and an image depicted by the laser beams at the same time. A mirror device or the like that scans a laser beam in a two-dimensional direction by causing a single-plate mirror to oscillate in a uniaxial or biaxial direction is used in the scanning units 103/108.

Further, a method of providing the image displayed to the user with a sense of perspective by modifying a wavefront curvature of the laser beam may be considered (see Patent Document 2, for example).

However, to realize a wide viewing angle and a high resolution in a beam scanning display apparatus, a beam waist position of the scanned laser must be modified in accordance with the laser beam scanning operation. Note that in this specification, the beam waist position is expressed as a distance between a beam waist of the scanned laser and a scanning unit.

To realize a high resolution in a beam scanning display apparatus, a beam spot diameter on the retina must be reduced. A human eye functions as a condenser lens. Therefore, when a parallel laser beam (a laser beam with an infinite radius of curvature) having a large beam diameter enters the eye, the incident light is condensed into a small spot on the retina of the human eye. As a result, a high-resolution image can be drawn on the retina. To form a beam entering the eye of the user into a parallel beam in an eyeglass-type beam scanning display apparatus, the beam waist position of the scanned laser must be modified in accordance with a movement of the scanning unit. In other words, the beam waist position of the scanned laser is modified in accordance with a location in which the scanned laser scanned by the scanning unit enters the deflecting unit. Thus, a laser beam traveling toward the eye of the user from the deflecting unit can be made into a parallel beam.

FIG. 2 shows an example of an optimum beam waist position for making a laser beam traveling toward the eye of the user into a parallel beam in an eyeglass-type display apparatus.

As shown in FIG. 2, the scanning unit 103 causes a laser beam L to enter the deflecting unit 104 diagonally. A hologram mirror designed to exhibit an action for condensing light into a pupil position 133 of the user is used as the deflecting unit 104.

Here, an appropriate beam waist position of the laser beam L varies according to the position in which the laser beam L enters the deflecting unit 104. In the drawing, a trajectory indicated by a dotted line 201 shows an example of an appropriate beam waist position of the laser beam L. More specifically, by performing control such that the beam waist position of the laser beam L remains positioned on the trajectory shown by the dotted line 201 even if the orientation of the laser beam L is altered by a movement of the scanning unit 103, the beam that enters the human eye can be made into a parallel beam.

To display a high-quality image, the scanning unit 103 must be moved at high speed (100 Hz or more, for example). In this case, the beam waist position of the scanned laser must be modified at high speed in accordance with the operation of the scanning unit 103. Therefore, a method of modifying the beam waist position of the laser beam at high speed by subjecting an optical component to simple harmonic driving, for example, is employed.

FIG. 3 shows a constitutional example of the principal parts of a conventional beam scanning HMD.

As shown in FIG. 3, the wavefront shape modification unit 102 includes lenses. These lenses 102a/102b are respectively subjected to simple harmonic driving in synchronization with the movement of the scanning unit 103. As a result, a horizontal direction beam waist position and a vertical direction beam waist position of the scanned laser are modified.

However, in a method where the beam waist position of the laser beam is modified at high speed by subjecting a lens or the like to simple harmonic driving, such as the conventional method described above, an actuator or the like for driving the lens is required, leading to an increase in the size of an optical system of the HMD. In an eyeglass-type HMD, the optical system needs to be small from the viewpoints of wearability and design, and it is therefore difficult to respond to this requirement with a lens driving method.

Further, with a method in which the lens position is modified using an actuator, an actual beam waist position may deviate greatly from an ideal beam waist position when an operation of the scanning unit deviates from an operation of the actuator. When a servo function is introduced to adjust this deviation, the size of the optical system increases even further.

In Patent Document 1 and Patent Document 2, however, the aforesaid problems regarding the size of the optical system for controlling the beam waist position are not taken into consideration.

CITATION LIST

Patent Literature

Patent Document 1: Japanese Patent Application Laid-open No. H10-301055

Patent Document 2: Japanese Patent Application Laid-open No. 2004-191946

DISCLOSURE OF THE INVENTION

An object of the present invention is to solve the aforesaid problems occurring in a beam scanning display apparatus by disposing means for adjusting a beam waist position between a scanning unit and a deflecting unit, thereby realizing both an improvement in the image quality of a scanning type image display apparatus and a reduction in the size of an optical system.

To achieve the object described above, a scanning type image display apparatus according to an aspect of the present invention includes: a light source unit for emitting a light beam; a scanning unit for scanning the light beam emitted from the light source unit; a deflecting unit for deflecting a scanned beam scanned by the scanning unit in a direction traveling toward an eye of a user; and a correction unit for correcting a beam waist position of the scanned beam, wherein the correction unit includes a fixed lens that is provided between the scanning unit and the deflecting unit and exhibits a fixed optical performance.

According to this constitution, the beam waist position of the scanned beam can be modified to an optimum position using the fixed lens, enabling an improvement in the quality of a displayed image. Further, since the beam waist position is corrected by the fixed lens, there is no need to drive a lens, a mirror, or the like, in contrast to the prior art, and therefore a high-quality image can be displayed to the user while achieving a reduction in the size of an optical system.

Further objects, features, and superior constitutions of the present invention will become apparent from the following description. Further, advantages of the present invention will become evident from the following description referencing the attached drawings.

BEST MODE FOR CARRYING OUT THE INVENTION

Embodiments of the present invention will be described below with reference to the drawings. Note that the following embodiments are specific examples of the present invention and are not intended to limit the technical scope of the present invention.

First Embodiment

An embodiment of the present invention will be described below with reference to the drawings. In this embodiment, an eyeglass-type HMD (Head Mounted Display) will be described as an example of a beam scanning display apparatus according to the present invention.

Figure 1:
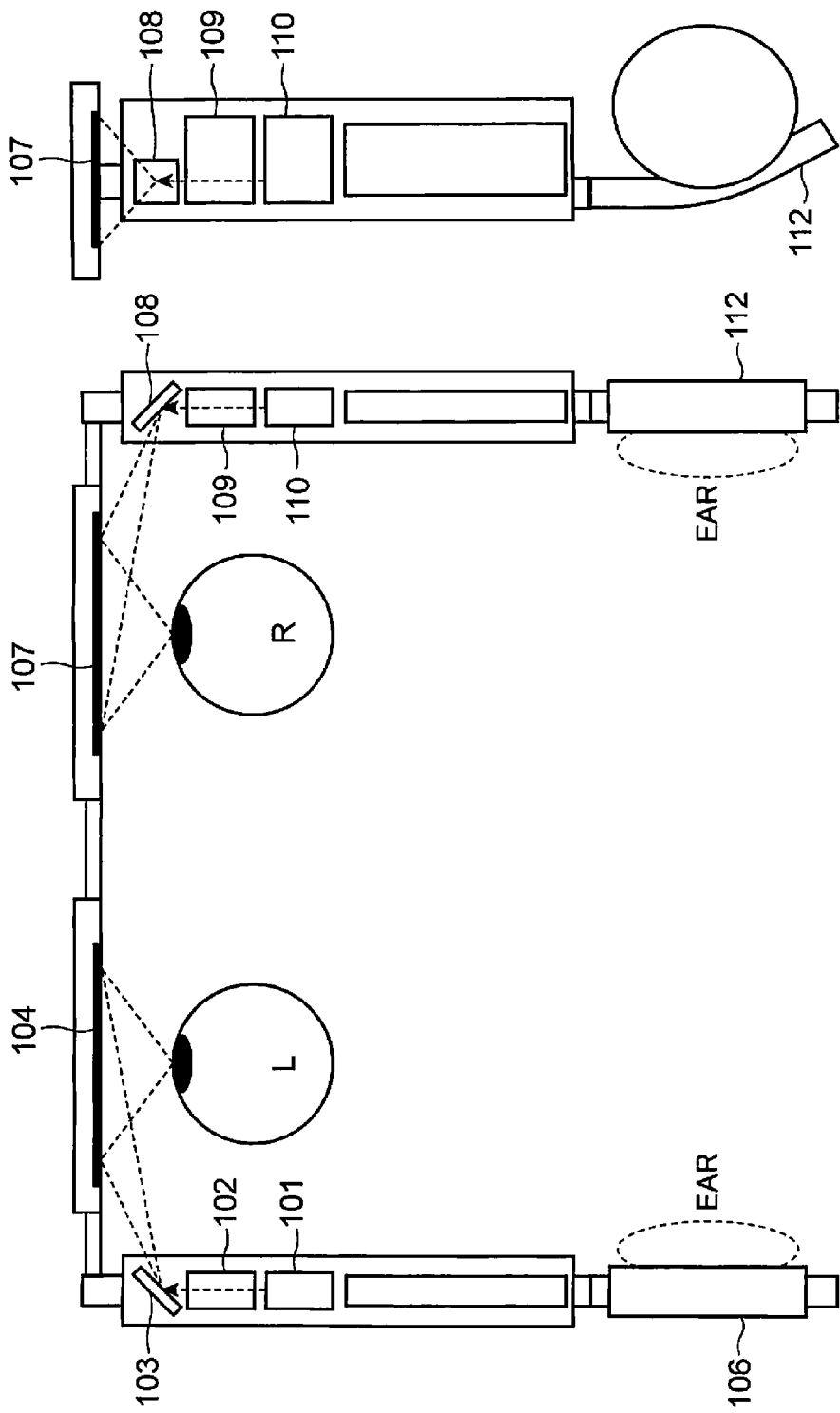
FIG. 1A is an illustrative view showing a constitutional example of a conventional eyeglass-type HMD.
FIG. 1B is an illustrative view showing a constitutional example of a conventional eyeglass-type HMD.
Figure 2:
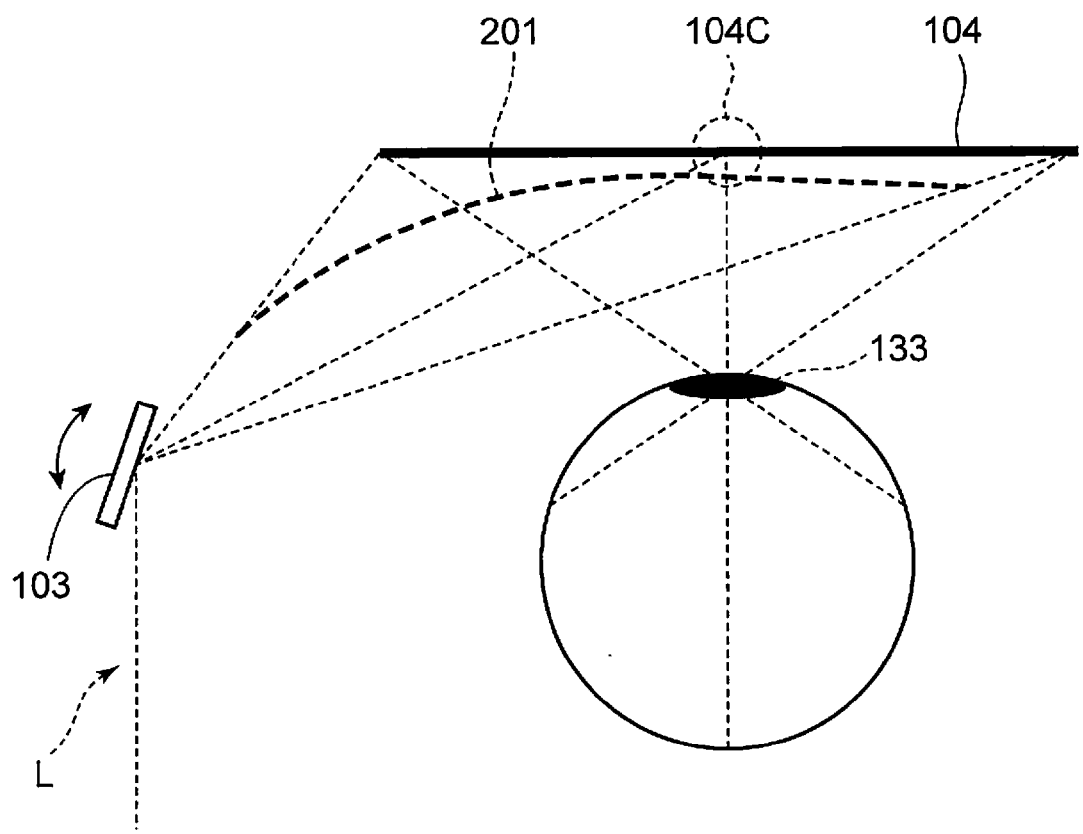
FIG. 2 is an illustrative view showing an example of an optimum beam waist position for making a laser beam directed toward an eye of a user into a parallel beam in an eyeglass-type display apparatus.
Figure 3:
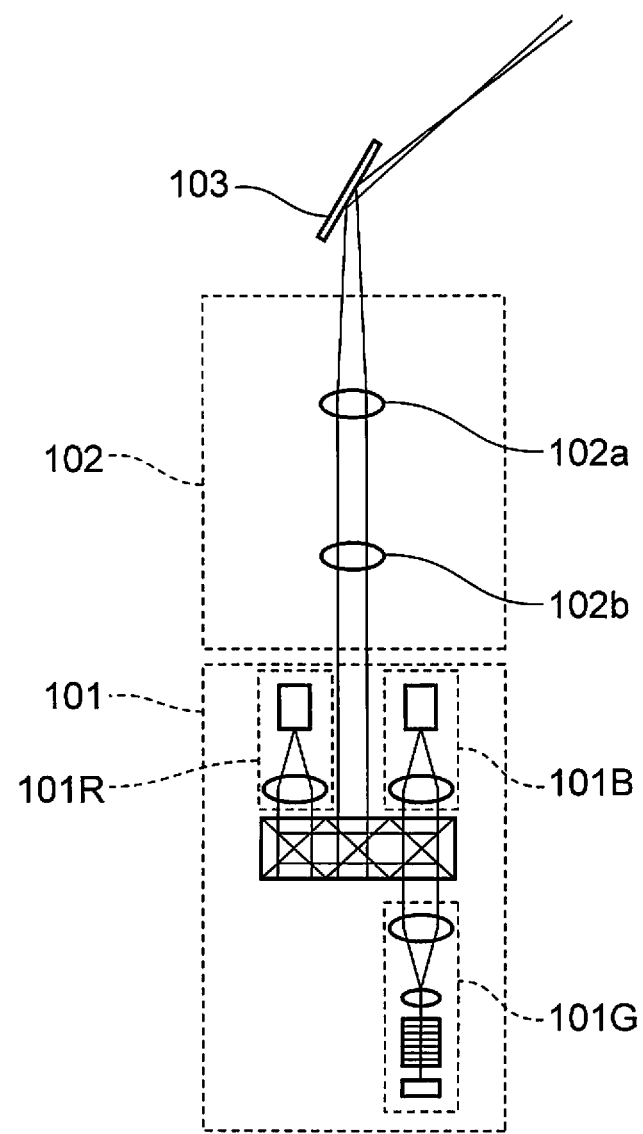
FIG. 3 is an illustrative view showing a constitutional example of the principal parts of a conventional beam scanning HMD.
Figure 4:
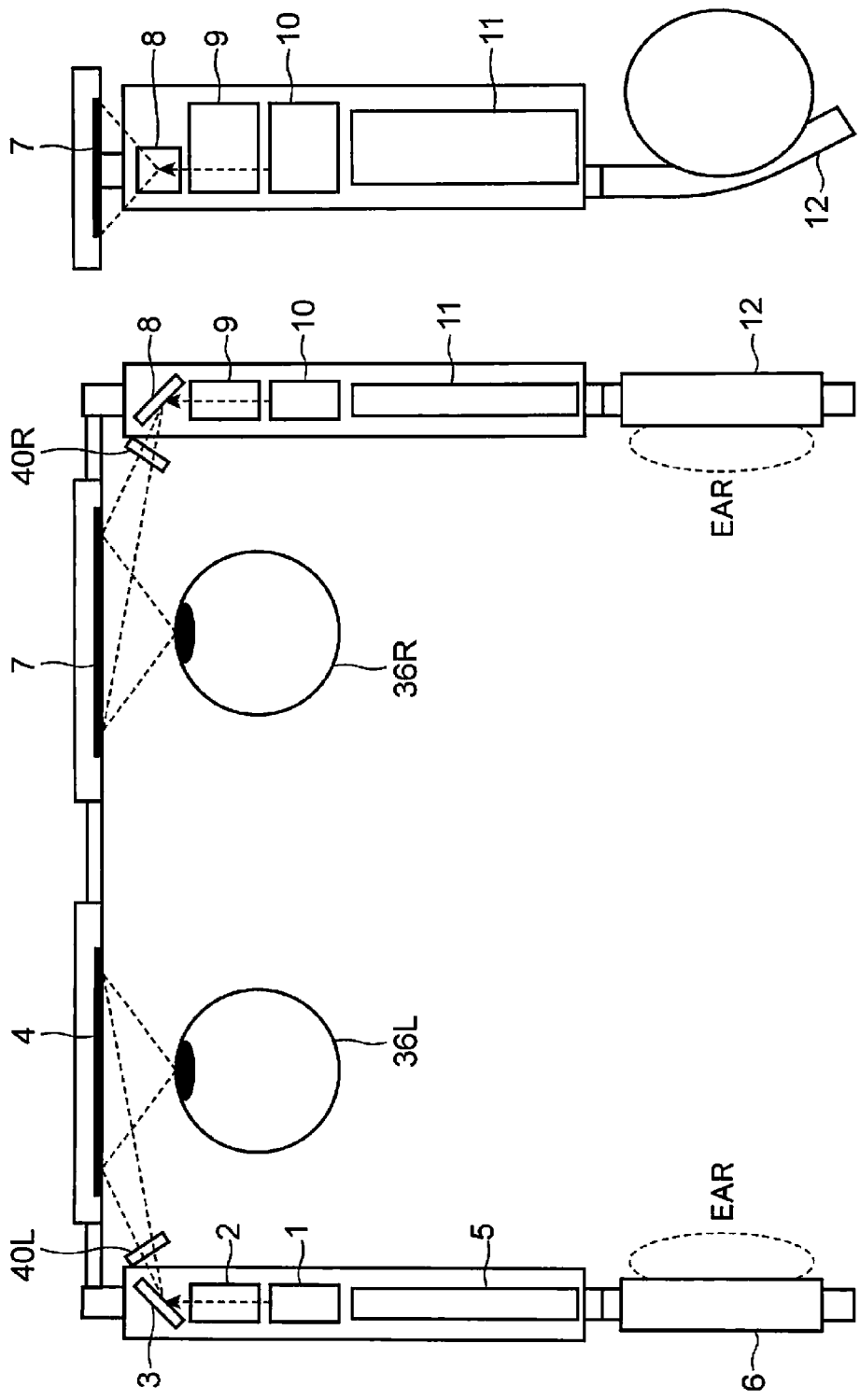
FIG. 4A is an illustrative view showing a constitutional example of an eyeglass-type HMD according to an embodiment of the present invention.
FIG. 4B is an illustrative view showing a constitutional example of the eyeglass-type HMD according to this embodiment of the present invention.
Figure 5:
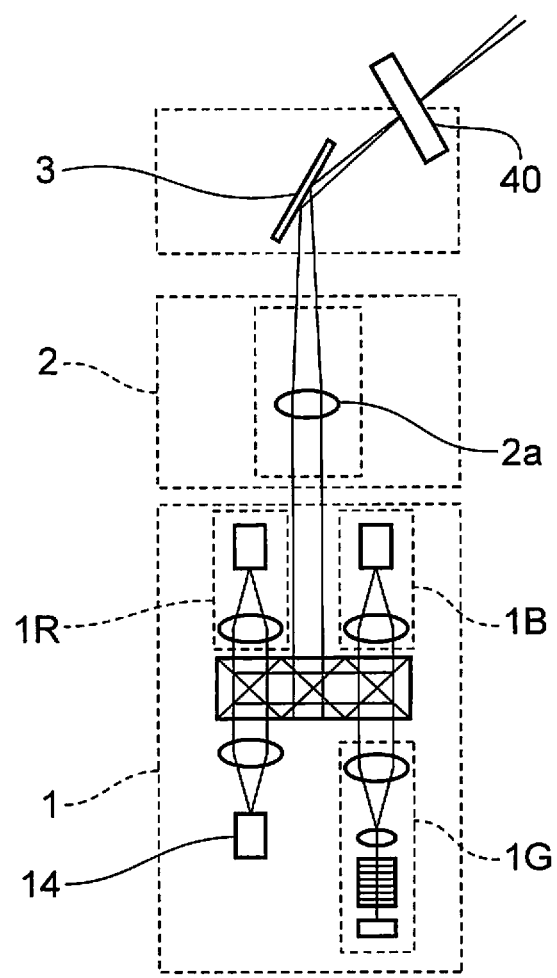
FIG. 5 is an illustrative view showing the principal constitution of the eyeglass-type HMD shown in FIGS. 4A and 4B.

FIG. 4A is a plan view showing a constitutional example of an eyeglass-type HMD according to the first embodiment. FIG. 4B is a side view of the eyeglass-type HMD shown in FIG. 4A. FIG. 5 is a view showing in detail the constitution of the eyeglass-type HMD shown in FIGS. 4A and 4B.

As shown in FIGS. 4A, 4B and 5, the eyeglass-type HMD according to this embodiment includes laser light sources 1/10 (light source units) that are carried on an eyeglass frame to emit laser beams (light beams), wavefront shape modification units 2/9 for controlling wavefronts of the laser beams, and scanning units 3/8 for scanning the laser beams in a two-dimensional direction.

As shown in FIG. 5, the laser light source 1 includes a red laser light source 1R, a blue laser light source 1B, and a green laser light source 1G. Laser beams in respective colors output from the laser light sources 1R, 1B and 1G are emitted after being multiplexed. At this time, a laser beam of a desired color can be output by adjusting the outputs from the laser light sources 1R, 1B and 1G of the respective colors appropriately.

Further, by adjusting the outputs from the laser light sources 1R, 1B and 1G of the respective colors in conjunction with movements of the scanning unit 3, to be described below, an image can be displayed on retinas of the eyes of a user.

In the constitution shown in FIG. 5, a red semiconductor laser light source, a blue semiconductor laser light source 12, and a light source combining an infrared semiconductor laser light source and an SHG (Second-Harmonic Generation) element for converting infrared into green are used as the red laser light source 1R, the blue laser light source 1B, and the green laser light source 1G, respectively. However, the laser light sources according to this embodiment are not limited thereto, and for example, a green semiconductor laser light source may be used as the green laser light source 1G. Further, solid lasers, liquid lasers, gas lasers, or light-emitting diodes may be used as the respective laser light sources 1R, 1B and 1G instead of semiconductor lasers.

In FIG. 5, an output intensity of the laser beams is adjusted in the respective laser light sources, but this embodiment is not limited thereto, and the laser beams may be adjusted using means for adjusting the beams output from the respective laser light sources in combination with the laser light sources.

Further, the laser light sources 1/10 may include a light detection unit 14 (FIG. 5) for detecting a sight line direction of the user by detecting the intensity of reflected light from corneas of the eyes of the user.

Most of the beams deflected in the direction of human eyes by the deflecting units 4/7 enter a cornea surface diagonally. However, a beam that is oriented head-on relative to the eyeballs enters the cornea surface perpendicularly, and therefore a reflectance of the beam is comparatively high. Hence, by employing the light detection unit 14 to detect the intensity of the reflection light from the corneas of the eyes of the user, the sight line direction can be detected.

The wavefront shape modification units 2/9 vary the wavefront shapes of the beams output respectively from the laser light sources 1/10, thereby adjusting the waveforms of the laser beams such that spot sizes of the beams deflected by the deflecting units 4/7, to be described below, enter a predetermined range.

Hereafter, the spot size of the beam will be defined as a spot size on the retina of the eye of the user. However, the spot size of the beam may be the spot size on the pupil, the spot size on the cornea, or the spot size on the deflecting unit, for example. Note that the spot size on the retina is identical to the size of a displayed pixel.

Note that the "wavefront shape" according to this embodiment is a three-dimensional shape of the beam wavefront, including a planar shape, a spherical shape, and an aspherical shape.

In the constitution shown in FIG. 5, a lens 2a is used as the wavefront shape modification unit 2 for determining the wavefront shape of the laser light emitted from the laser light source 1.

In this embodiment, the arrangement position and shape of the lens 2a are set such that a beam waist position of the laser beam is optimized when the laser beam travels toward a central part (4C in FIG. 6) of the deflecting unit 4. In other words, the lens 2a (wavefront shape modification unit) is provided so that the beam waist position of the laser beam exists on an optimum beam waist position line indicated by $W_O$ in FIG. 6.

There are no particular limitations on the shape of the lens 2a according to this embodiment, and for example, a concave lens, a convex lens, a cylindrical lens, and so on may be used. These lenses may also be used in combination. Furthermore, a diffraction optical element may be used instead of a lens. In this case, reductions in the thickness and weight of the optical element can be realized.

The scanning units 3/8 scan the laser beams passing respectively through the wavefront shape modification units 2/9 two-dimensionally. A single-plate small mirror such as a MEMS (Micro Electro Mechanical System) micro-mirror that can modify an angle of a laser beam two-dimensionally may be employed as the scanning units 3/8. Note that the scanning units 3/8 may be realized by a combination of two or more types of scanning units for performing horizontal scanning and vertical scanning. In this case, horizontal scanning and vertical scanning operations can be performed independently, thereby facilitating control.

Note that a laser beam scanning method employed by the scanning units 3/8 is not limited to a method of physically tilting the mirrors, and a method of moving a lens or rotating a diffraction element, for example, may be used instead. Further, a method employing a liquid crystal lens, a variable shape lens, or a deflecting element such as an AO element (an acousto-optic element) or an EO element (an electro-optic conversion element) may be used.

The deflecting units 4/7 modify the orientation of the beams scanned by the scanning units 3/8 to a direction traveling respectively toward the eyes of the user. The deflecting units 4/7 are formed such that the beams scanned by the scanning units 3/8 are diffracted/condensed in the pupils of the eyes of the user. The deflecting units 4/7 may include a photopolymer layer formed on an inner side (an eye side) of the lenses of the eyeglasses, and a Lippmann volume hologram may be formed on the photopolymer layer.

Three holograms for reflecting the laser beams output from the laser light sources of the respective colors, i.e. red, blue and green, may be formed in a multi-layer structure as the hologram formed on the photopolymer layer. Alternatively, three layers of holograms corresponding to the laser beams of the respective colors may be provided in a laminated constitution.

By providing a constitution that uses a wavelength selectivity of the hologram, light of wavelengths other than the light source wavelength (the majority of ambient light) is transmitted without being subjected to a diffraction effect such that only light of the light source wavelength is diffracted. As a result, a transmission type display can be realized.

Note that the deflecting units 4/7 are not limited to a constitution that deflects light using a diffraction element such as a hologram, and a mirror such as a concave mirror or a lens such as a convex lens may be used instead. In this case, the deflecting units 4/7 can be manufactured more easily than when a hologram is used.

Control units 5/11 include integrated circuits for controlling the respective parts of the HMD, and control the outputs of the respective lasers as well as operations of the wavefront shape modification units 2/9 and the scanning units 3/8. The control units 5/11 include means for determining content to be displayed to the user. Note that the control units 5/11 may include communicating means for establishing a wireless connection with a peripheral device such as a mobile telephone and receiving image and sound signals. The control units 5/11 may also include a memory for storing an image to be displayed to the user, and the image to be displayed to the user may be obtained wirelessly from an external device.

A constitution in which the control units 5/11 are provided on the left and right sides of the eyeglasses, respectively, will be described, but this embodiment is not limited thereto, and a control unit may be provided on only one of the left and right sides. More specifically, one of the control unit 5 and the control unit 11 may control the respective operations of the laser light sources 1/10, the wavefront shape modification units 2/9, the scanning units 3/8, and headphones 6/12 corresponding to both eyes. In this case, a reduction in manufacturing cost and a reduction in the overall weight of the display apparatus can be realized in comparison with a case in which the control units 5/11 are provided on both the left and right sides of the eyeglasses.

The headphone units 6/12 includes speakers (not shown) so as to output sound. Note that the headphone units 6/12 may be provided with a battery for supplying power to the respective parts of the HMD. In this case, the need to provide the HMD with a cable for supplying power from an external power source is eliminated, and therefore a cordless apparatus can be realized, enabling an improvement in the wearability of the HMD.

In this embodiment, a fixed lens 40 exhibiting a fixed optical performance is used as a correction unit for correcting the beam waist position of the scanned beam. The fixed lens 40 according to this embodiment includes a left eye fixed lens 40L and a right eye fixed lens 40R.

The fixed lenses 40L/40R are disposed between the scanning units 3/8 and the deflecting units 4/7, respectively, so as to modify the beam waist positions of the laser beams scanned by the scanning units 3/8 in accordance with the positions in which the laser beams enter the fixed lenses 40L/40R. The function and shape of the fixed lenses 40L/40R will be described in detail below.

The respective members constituting the HMD may all be installed in a single HMD, but the present invention is not limited to this embodiment. For example, the headphone units, from among the members constituting the HMD shown in FIG. 4, need not be provided. Further, the members constituting the respective constitutional elements of the HMD may be disposed in a dispersed fashion. Furthermore, a part of the constitutional members constituting the control units 5/11 may be included in the scanning units 3/8 or the wavefront shape modification units 2/9. Further, for example, the respective parts shown in FIGS. 4A and 4B may be shared among a plurality of devices. For example, the laser light sources may be shared by two HMDs. When the laser light sources are shared by a plurality of HMDs, a constitution in which one of the laser light sources is provided in one HMD and this laser light source is connected to another HMD by optical fiber may be employed. Alternatively, the laser light sources may be housed in a separate housing to the plurality of HMDs and the laser light sources may be connected to the plurality of HMDs by optical fiber.

Next, an operation of the fixed lenses 40L/40R for correcting the beam waist position in accordance with a laser scanning operation will be described in detail. To simplify the following description, only a constitution corresponding to one of the eyes of the HMD, in this case the left eye, will be described. Note, however, that similar processing is performed in relation to the constitution corresponding to the right eye.

Figure 6:
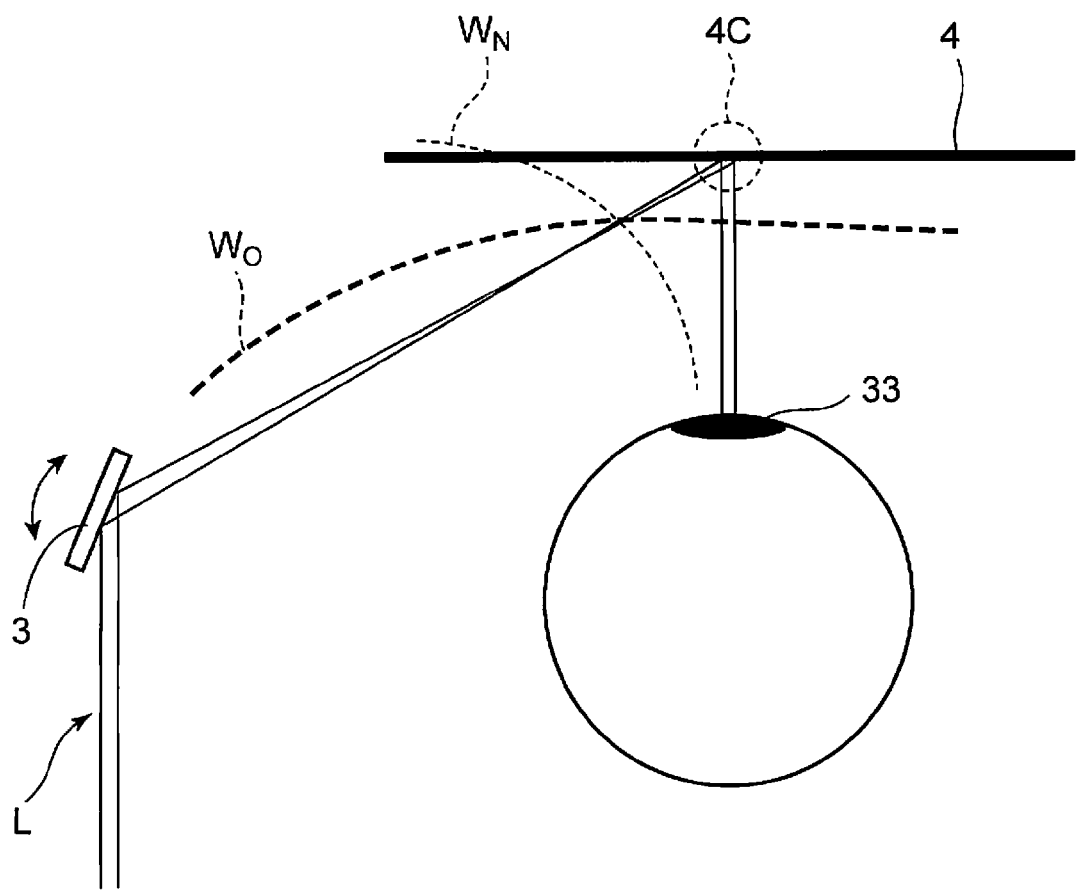
FIG. 6 is an illustrative view showing variation in a beam waist position of a laser beam in a constitution not including a fixed lens.

FIG. 6 is an illustrative view showing the manner in which the beam waist position of a laser beam L varies in accordance with movement of the scanning unit 3 in a constitution not having the fixed lens 40L.

As described above, the wavefront shape modification unit 2 is set such that the beam waist position is optimized when the laser beam L travels toward the center 4C of the deflecting unit 4. As shown in FIG. 6, when the beam waist position is not modified in accordance with the operation of the scanning unit 3, the beam waist position of the laser beam draws an arc $W_N$ having a radius that extends from the scanning unit 3 to the beam waist position in accordance with the operation of the scanning unit 3. Hereafter, a position indicated by this arc-shaped trajectory $W_N$ will be referred to as an uncorrected beam waist position. As is evident from FIG. 6, the uncorrected beam waist position $W_N$ not subjected to correction by the fixed lens 40 deviates greatly from the optimum beam waist position $W_O$. As a result, laser beams other than a laser beam traveling toward the center 4C of the deflecting unit 4 do not form parallel beams as they pass through a pupil 33 of the user, and instead widen greatly on the retina. In this condition, a high-resolution image cannot be presented to the user.

Hence, this embodiment, as will be described below, is provided with a featured constitution in which the fixed lens 40 is disposed between the scanning unit 3 and the deflecting unit 4 as a correction unit for correcting the beam waist position of the laser beam.

Typically, when a laser beam passes through a convex lens, the beam waist position thereof moves to a near side (in a direction approaching the light source), and when the laser beam passes through a concave lens, the beam waist position thereof moves to a far side (in a direction heading away from the light source).

Figure 7A:
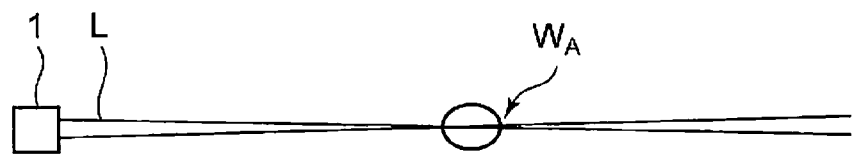
FIG. 7A is an illustrative view showing variation in the beam waist position of the laser beam during passage through a lens.
Figure 7B:
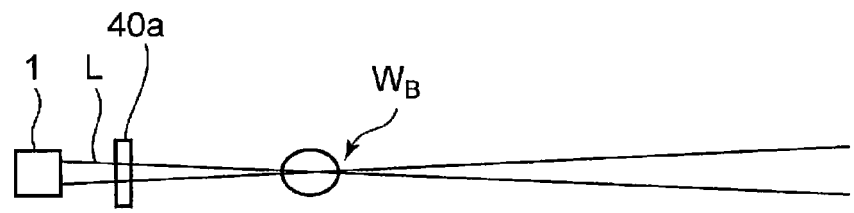
FIG. 7B is an illustrative view showing variation in the beam waist position of the laser beam during passage through the lens.
Figure 7C:
FIG. 7C is an illustrative view showing variation in the beam waist position of the laser beam during passage through the lens.

More specifically, with regard to the laser beam L (FIG. 7A) having a beam waist position $W_A$, when a convex lens 40a is disposed between the light source 1 and the beam waist position $W_A$, the beam waist of the laser beam L moves to the near side (in a direction approaching the light source), as shown in FIG. 7B, such that the beam waist is formed in a position indicated by $W_B$ in FIG. 7B. On the other hand, when a concave lens 40b is disposed between the light source and the beam waist position $W_A$ with regard to the laser beam L (FIG. 7A) having the beam waist position $W_A$, the beam waist of the laser beam L moves to the far side (in a direction heading away from the light source), as shown in FIG. 7C, such that the beam waist is formed in a position indicated by $W_C$ in FIG. 7C.

Comparing the uncorrected beam waist position $W_N$ to the optimum beam waist position $W_O$, the uncorrected beam waist position $W_N$ of the laser beam L, which travels toward an ear side part of the deflecting unit 4 (a part closer to the scanning unit 3 than the center 4C of the deflecting unit 4), as shown in FIG. 6, deviates to the far side (the direction heading away from the light source) of the ideal beam waist position $W_O$. Further, the uncorrected beam waist position $W_N$ of a laser beam that travels toward a noise side part of the deflecting unit 4 (a part farther from the scanning unit 3 than the center 4C of the deflecting unit 4) deviates to the near side (the direction approaching the light source) of the ideal beam waist position $W_O$.

Hence, by causing the laser beam traveling toward the ear side part of the deflecting unit 4 to pass through a convex lens and causing the laser beam traveling toward the nose side part of the deflecting unit 4 to pass through a concave lens, the beam waist positions thereof can be corrected such that the beam waist position of the laser beam traveling toward the ear side moves to the near side and the beam waist position of the laser beam traveling toward the nose side moves to the far side. Hence, an error between the beam waist position of the laser beam L scanned by the scanning unit 3 and the ideal beam waist position $W_O$ can be reduced, and as a result, the image quality of the image displayed on the eyes of the user can be improved.

Figure 8:
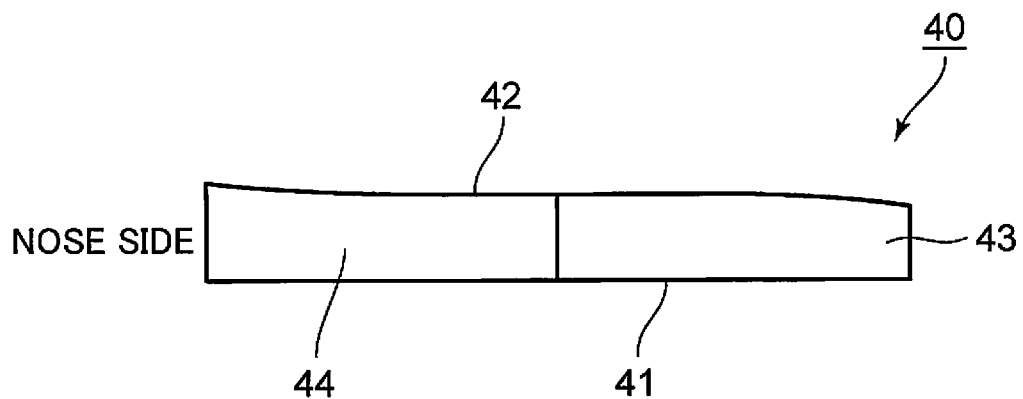
FIG. 8 is an illustrative view showing the shape of the fixed lens, according to this embodiment.
Figure 9:
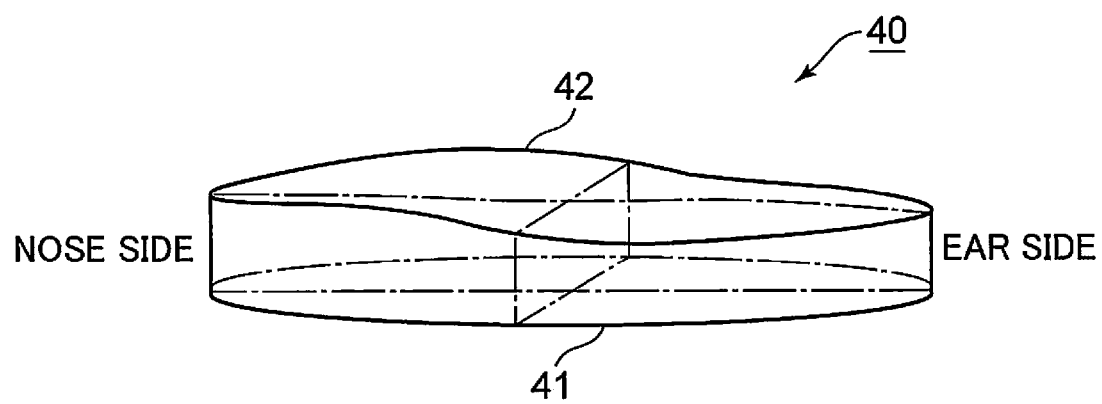
FIG. 9 is an illustrative view showing the shape of the fixed lens, according to this embodiment.

In this embodiment, a free-form surface lens is used as the fixed lens 40. FIGS. 8 and 9 show the shape of the fixed lens 40. FIG. 8 is a side view showing the shape of the fixed lens 40 from a side face. FIG. 9 is an illustrative view showing the shape of the fixed lens 40 from an oblique upward position. As shown in FIGS. 8 and 9, in this embodiment, the fixed lens 40 has a planar entrance surface 41 and a free-form surface-shaped exit surface 42. The fixed lens 40 is disposed such that the entrance surface 41 faces the scanning unit 3 side and the exit surface 42 faces the deflecting unit 4 side. Further, as shown in FIG. 10, the fixed lens 40 is disposed such that the laser beam L traveling toward the center 4C of the deflecting unit 4 enters a central part of the entrance surface 41 perpendicularly.

As shown in FIGS. 8 and 9, the exit surface 42 forming the free-form surface of the fixed lens 40 is designed such that an ear side region 43 (a part through which laser beams traveling toward the ear side part of the deflecting unit 4 pass), which is closer to the scanning unit 3 than a central part of the exit surface 42, has a convex shape whereas a nose side region 44 (a part through which laser beams traveling toward the nose side part of the deflecting unit 4 pass), which is further from the scanning unit 3 than the central part of the exit surface 42, has a concave shape. Note that the exit surface 42 is set such that the center thereof has a curvature of zero.

Figure 10:
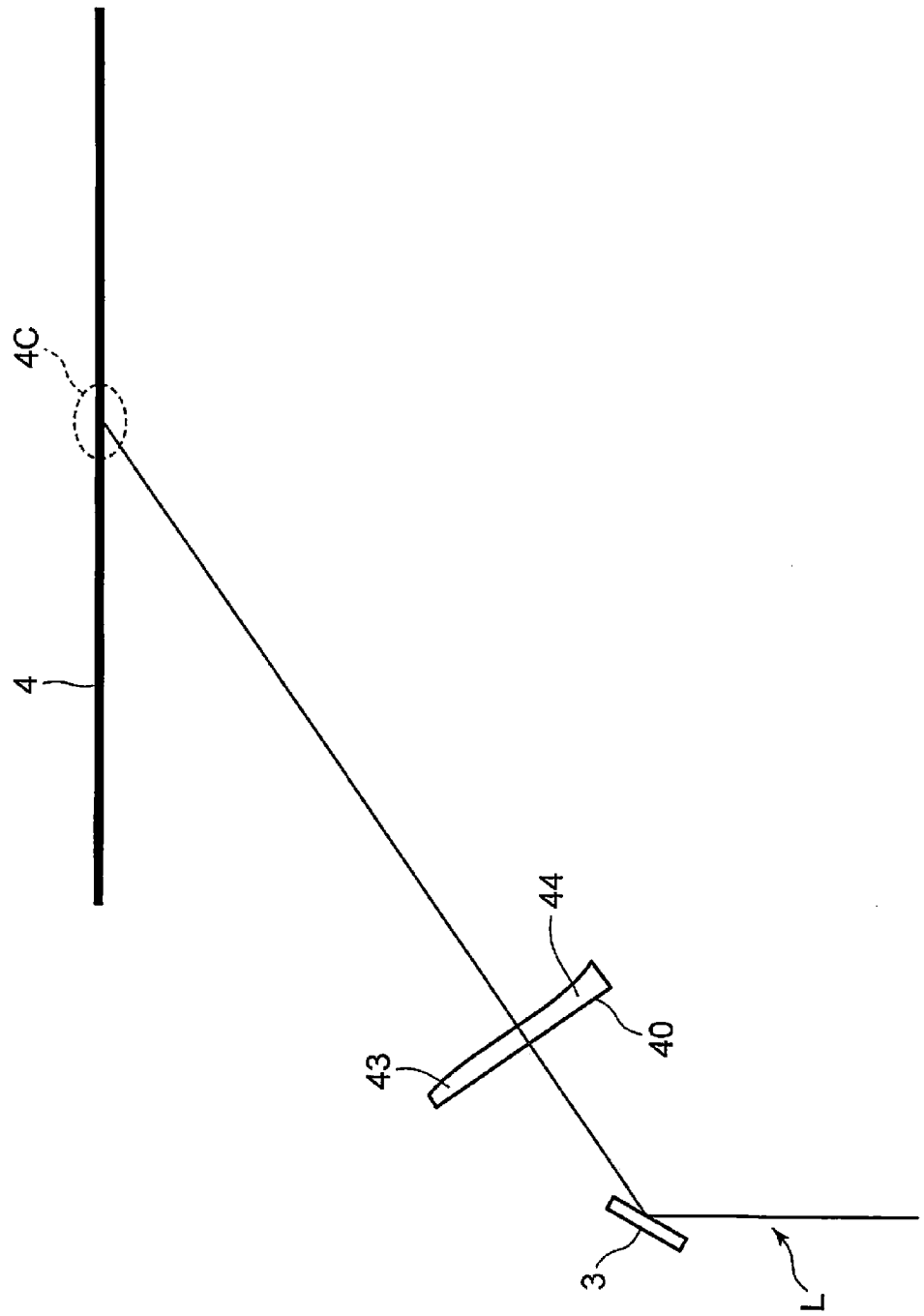
FIG. 10 is an illustrative view showing an arrangement example of a correction unit, according to this embodiment.

By disposing the free-form surface lens having the above constitution as the fixed lens 40 in the manner shown in FIG. 10, a laser beam traveling toward the ear side part of the deflecting unit 4 passes through the ear side region 43 serving as the convex surface part of the free-form surface lens. As a result, the beam waist position of the laser beam traveling toward the ear side part of the deflecting unit 4 is moved in a direction approaching the light source by the action of the convex lens.

Figure 11:
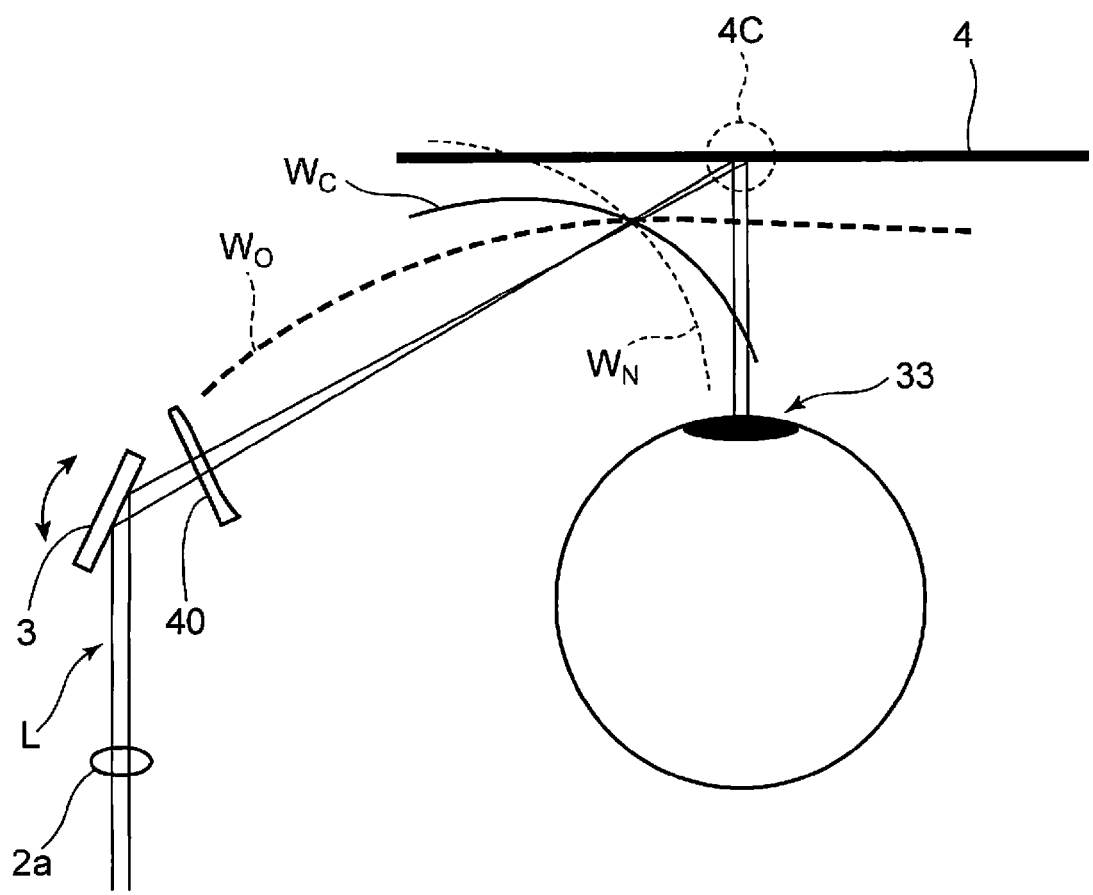
FIG. 11 is an illustrative view showing an example of the beam waist position of a scanned beam corrected by the correction unit, according to this embodiment.

On the other hand, a laser beam traveling toward the nose side part of the deflecting unit 4 passes through the noise side region 44 serving as the concave surface part of the free-form surface lens. As a result, the beam waist position of the laser beam traveling toward the nose side part of the deflecting unit 4 is moved in a direction heading away from the light source 1 by the action of the concave lens. Hence, as shown in FIG. 11, the beam waist position of the laser beam during the scanning operation of the scanning unit 3 can be corrected to a corrected waist position indicated by a trajectory $W_C$ from the uncorrected beam waist position indicated by the trajectory $W_N$. The beam waist position of the laser beam can thus be brought closer to the ideal beam waist position indicated by the trajectory $W_O$ in the drawing, and as a result, an improvement in the image quality of the image displayed on the eyes of the user can be achieved.

Note that variation in the curvature of the exit surface 42 constituted by free-form surface need not be constant. As shown in FIG. 6, a difference between the uncorrected beam waist position $W_N$ and the ideal beam waist position $W_O$ increases steadily as the laser beam shifts toward the ear side or the nose side from the center 4C of the deflecting unit 4. The beam waist position of a laser beam passing through a concave lens or a convex lens typically varies by a steadily larger amount as an absolute value of the curvature of the lens increases. Therefore, in this embodiment, if the curvature of the central part of the free-form surface is set at zero, the absolute value of the curvature is set to increase at fixed distance intervals from the center in the ear side region constituted by a convex lens. Similarly, the absolute value of the curvature is set to increase at fixed distance intervals from the center in the nose side region constituted by a concave lens. Note that since the ear side region and the nose side region are convex and concave, respectively, a sign of the curvature is reversed. In other words, the absolute value of the curvature of the free-form surface increases steadily from the center of the lens. Hence, the beam waist position can be corrected appropriately even when the difference between the uncorrected beam waist position and the ideal beam waist position increases steadily from the center, as shown in FIG. 6.

Further, even when the curvature of the exit surface 42 constituted by a free-form surface varies in accordance with the distance from the center of the lens, the degree of variation in the absolute value of the curvature need not be identical on the ear side and the nose side. In this embodiment, as shown in FIG. 6, the difference between the uncorrected beam waist position $W_N$ and the ideal beam waist position $W_O$ is greater on the ear side than on the nose side when a laser beam enters the deflecting unit 4 diagonally. By making the degree of variation in the absolute value of the curvature of the free-form surface lens greater in the ear side region 43 than in the nose side region 44, as in this embodiment, the uncorrected beam waist position $W_N$ can be brought closer to the ideal beam waist position $W_O$ more appropriately.

Figure 21:
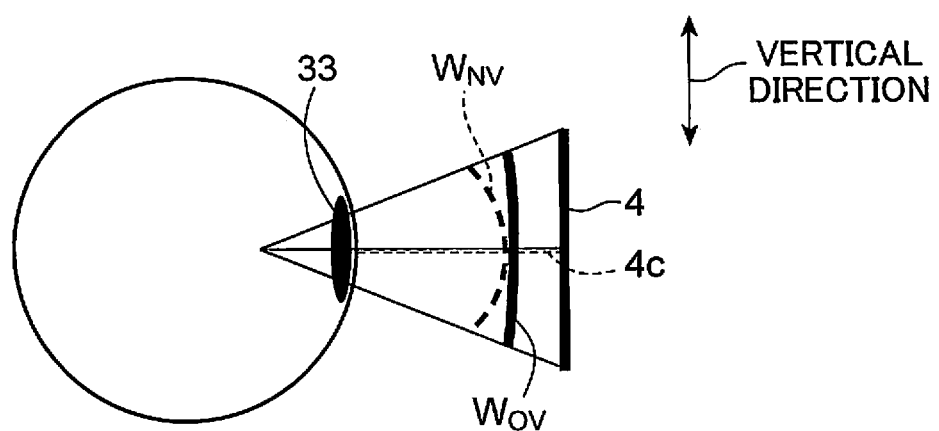
FIG. 21 is an illustrative view showing correction of a beam waist position relative to laser beam scanning in a vertical direction, according to an embodiment of the present invention.

Beam waist position correction relative to laser beam scanning in a horizontal direction (a first direction) was described above, but beam waist position correction relative to laser beam scanning in a vertical direction (a second direction) is performed similarly. More specifically, when a laser beam is scanned in the vertical direction, as shown in FIG. 21, the optical performance of a fixed lens constituting the fixed lens 40 is determined such that a beam waist position $W_{NV}$ of the laser beam in a case where correction is not performed by the fixed lens 40 approaches (matches as closely as possible) an optimum beam waist position $W_{OV}$. The fixed lens constituting the fixed lens 40 is preferably formed such that an absolute value of a vertical direction curvature thereof decreases linearly in proportion to increases in a vertical direction distance from a curvature center portion. In other words, the fixed lens constituting the fixed lens 40 has a predetermined vertical curvature variation width (an amount of variation in the curvature per unit distance in the vertical direction) and is constituted such that every time a fixed distance is reached in the vertical direction from the curvature center portion, the absolute value of the vertical direction curvature of the free-form surface decreases by an amount corresponding to the value of the curvature variation width. As a result, the vertical direction beam waist position can be corrected appropriately so as to approach the optimum beam waist position $W_{OV}$ shown in FIG. 21.

Note that the horizontal direction curvature and the vertical direction curvature of the free-form surface may be set independently. In this case, the horizontal direction curvature may be varied such that the absolute value of the curvature increases steadily from the center of the lens, as described above, while the vertical direction curvature remains fixed, for example, or the horizontal direction curvature and vertical direction curvature may be set appropriately in accordance with another condition. Furthermore, the free-form surface may be designed such that the absolute value of the vertical direction curvature decreases steadily from the center (the curvature center portion) of the lens, as described above. In this case, the beam waist position can be brought closer to an optimum location during a vertical scanning operation of the scanning unit 3, as shown in FIG. 21, as well as a horizontal direction scanning operation.

Further, the fixed lens 40 according to this embodiment is not limited to a lens in which the entrance surface 41 is planar, and the entrance surface 41 may be a concave surface, a convex surface, or a free-form surface. In this case, the beam waist can be optimized in relation to points other than a point passing through the center of the lens, and moreover, aberration can be reduced.

The fixed lens 40 may be formed such that the entrance surface 41 is a free-form surface and the exit surface 42 is a planar surface. In this case, the free-form entrance surface 41 side is not exposed to the outside of the HMD. Therefore, the free-form lens surface, which has a complicated structure, can be protected.

Furthermore, in this embodiment, the wavefront shape modification unit 2 is adjusted such that the beam waist position of a laser beam traveling toward the center 4C of the deflecting unit 4 is optimized. However, beams passing through other points may also be optimized. For example, by adjusting the wavefront shape modification unit 2 such that the beam waist position of a laser beam traveling toward a rightward end of the screen is optimized, the resolution of the right side of the screen is optimized more than the center of the screen.

Another constitutional example of this embodiment will now be described with reference to FIGS. 12 and 13.

Figure 12:
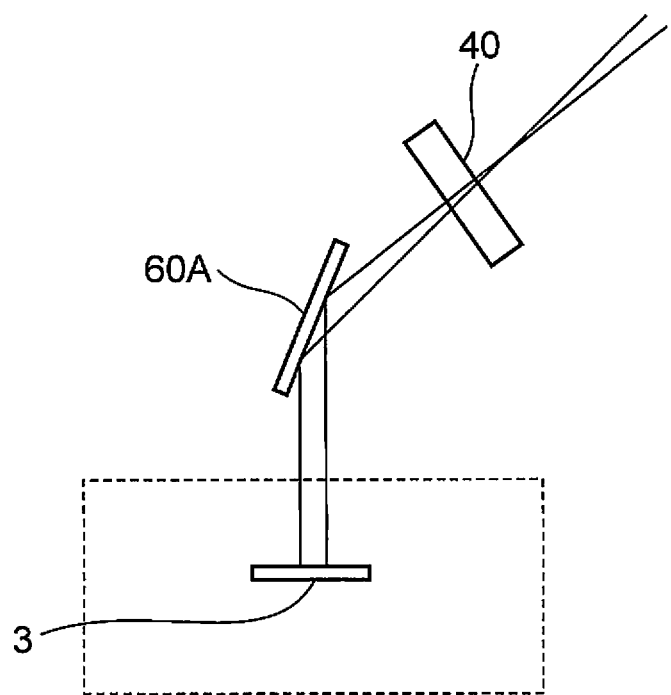
FIG. 12 is an illustrative view showing arrangement of a folding mirror between a scanning unit and the correction unit, according to this embodiment.

FIG. 12 is an illustrative view showing arrangement relationships between the fixed lens 40, the scanning unit 3, and a folding mirror, in which these members are seen from above. FIG. 13, meanwhile, is an illustrative view showing the arrangement relationships of the members shown in FIG. 12 from the side.

In the example described above, the fixed lens 40 is disposed directly between the scanning unit 3 and the deflecting unit 4, but this embodiment is not limited to the above constitution.

Figure 13:
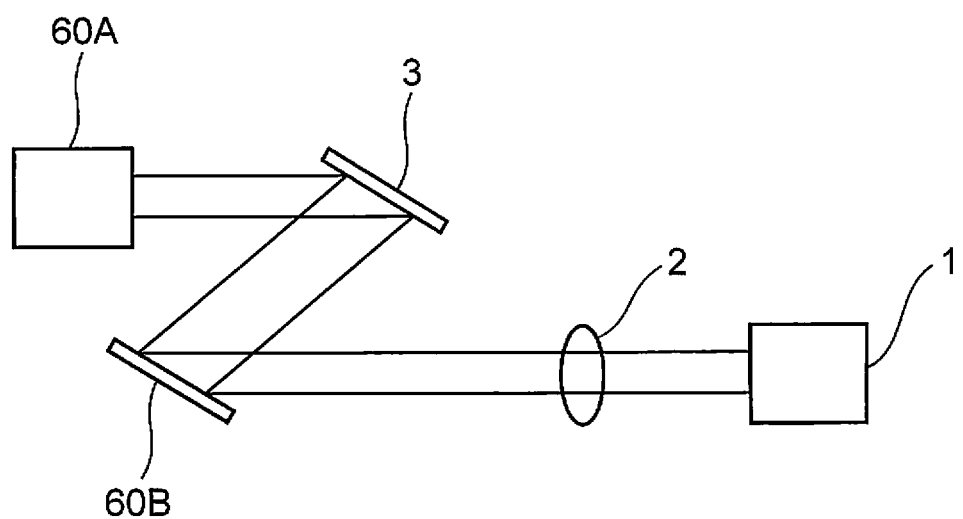
FIG. 13 is an illustrative view showing arrangement of the folding mirror between the scanning unit and a light source, according to this embodiment.

In the constitution shown in FIGS. 12 and 13, a folding mirror 60A is disposed between the fixed lens 40 and the scanning unit 3 and a folding mirror 60B is disposed between the scanning unit 3 and the wavefront shape modification unit 2.

By providing a folding mirror or the like between the fixed lens 40 and the scanning unit 3 in this manner, a distance between the scanning unit 3 and the fixed lens 40 can be increased. As a result, the distance between the fixed lens 40 and the scanning unit 3 can be increased while keeping the size of the optical system small. When the distance between the fixed lens 40 and the scanning unit 3 is increased, a region in which the laser beam enters the fixed lens 40 during scanning increases, making it easier to set an optimum curvature for correcting the beam waist position in each entrance position of the laser beam.

Further, a laser beam traveling toward the center 4C of the deflecting unit 4 does not necessarily have to pass through the center of the fixed lens 40. For example, a laser beam traveling toward a specific point in the region on the ear side of the center 4C of the deflecting unit 4 may be set to pass through the center of the fixed lens 40. In this case, the size of the fixed lens 40 can be reduced in cases such as when a display screen is enlarged on the ear side alone. A case in which a message such as "You've got mail" is displayed in the ear side display region so that the field of vision is not obstructed when the user is walking outside while wearing the eyeglass-type HMD may be cited as an example of a case in which only the ear side of the display screen is enlarged.

Further, the curvature of the free-form surface of the fixed lens 40 need not be set at zero in relation to laser beams traveling toward the center 4C of the deflecting unit 4. For example, processing may be performed to set the curvature of the free-form surface at zero in a part corresponding to a specific point of the fixed lens 40 in the region on the ear side of the center 4C of the deflecting unit 4, through which a laser beam traveling toward the specific point passes following optimization by the wavefront shape modification unit 2, or the like. In this case, effects such as optimization of the ear side image quality are obtained.

Furthermore, the correction unit according to this embodiment is not limited to the above constitution employing a single lens, and two or more lenses may be used. In this case, a constitution such as that shown in FIG. 14, for example, in which a correction lens 40H is provided as a lens for correcting the horizontal direction beam waist position and a correction lens 40V is provided as a lens for correcting the vertical direction beam waist position, may be employed.

Figure 14:
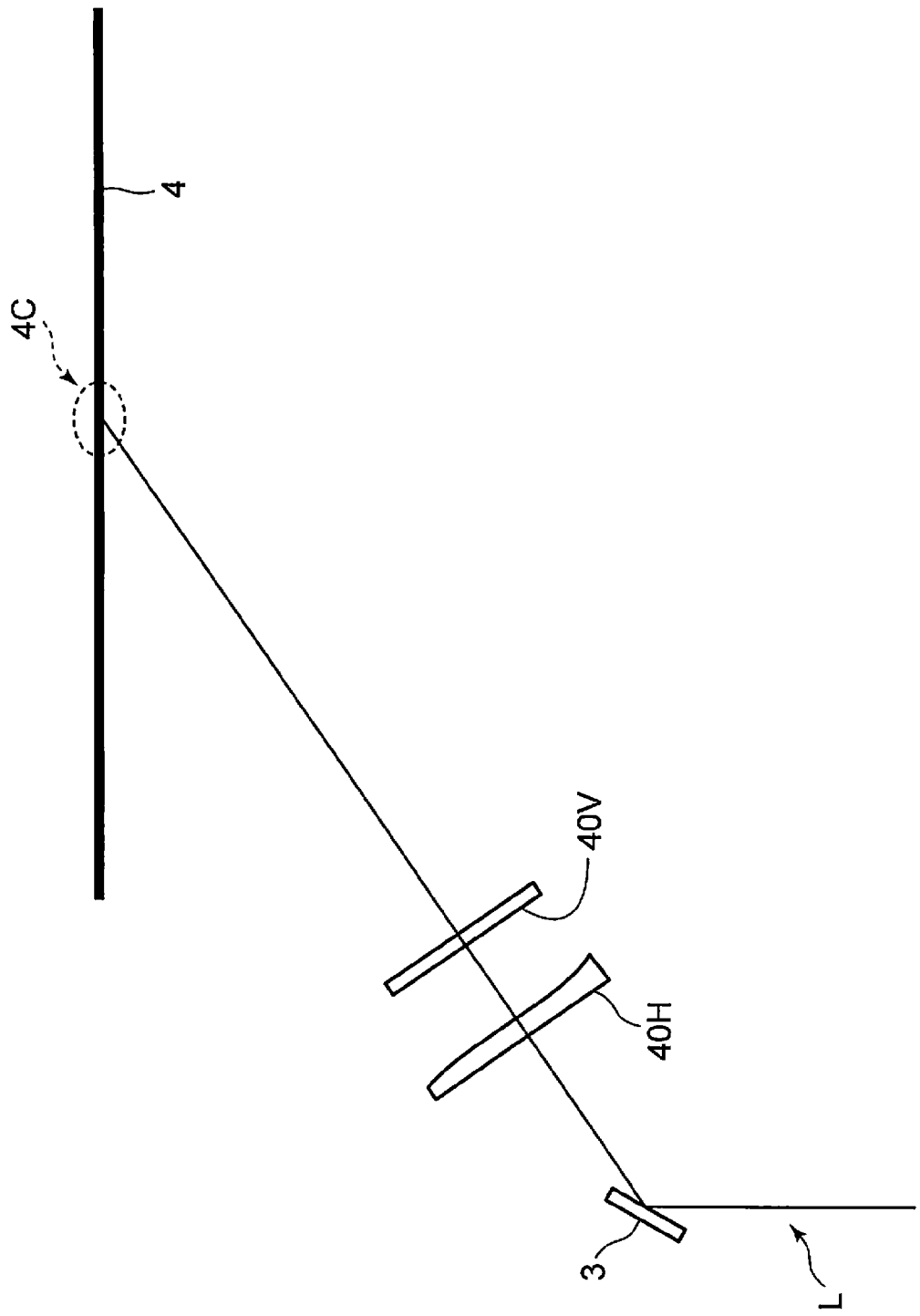
FIG. 14 is an illustrative view showing an arrangement example of a correction unit constituted by a plurality of lenses, according to this embodiment.

More specifically, in the constitution shown in FIG. 14, the lens 40 is constituted by the correction lens 40V for correcting the vertical direction beam waist position of the laser beam and the correction lens 40H for correcting the horizontal direction beam waist position of the laser beam.

In this case, a free-form surface lens having only vertical direction curvature may be used as the correction lens 40V and a free-form surface lens having only horizontal direction curvature may be used as the correction lens 40H. The correction lens 40V and the correction lens 40H can thus be designed and manufactured easily.

However, the fixed lens 40 according to this embodiment is not limited to the above constitution, and may be constituted by a plurality of combined lenses instead of a free-form surface lens. In this case, the need to manufacture a special free-form surface lens during manufacture of the fixed lens 40 is eliminated, and therefore an image display apparatus can be manufactured easily.

Figure 22:
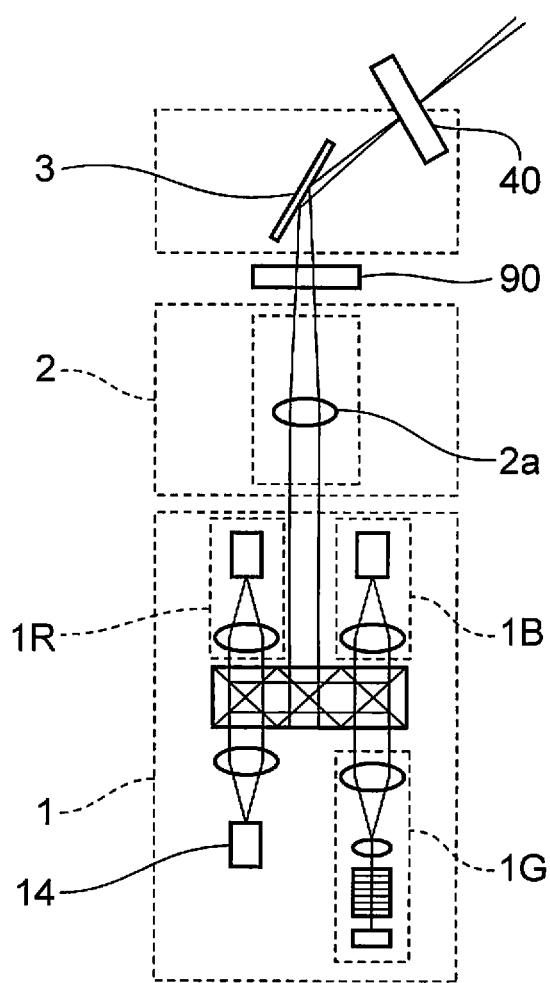
FIG. 22 is an illustrative view showing an example of the principal constitution of an eyeglass-type HMD according to another embodiment of the present invention.

Moreover, the eyeglass-type HMD according to this embodiment may further include an aberration correction lens 90 provided between the scanning unit 3 and the laser light source 1, as shown in FIG. 22. The aberration correction lens 90 has a free-form surface on which the signs of the curvature are opposite to those of the free-form surface of the fixed lens 40 described above. The aberration correction lens 90 is capable of suppressing the effect of aberration generated by the fixed lens 40, and therefore coma aberration can be corrected easily. Hence, by providing the aberration correction lens 90, a further improvement in the image quality of the image displayed to the user can be achieved.

Second Embodiment

Another embodiment of the present invention will now be described below with reference to the drawings. Similar constitutional elements to those of the first embodiment have been allocated similar member numbers and description thereof has been omitted where appropriate.

Figure 15:
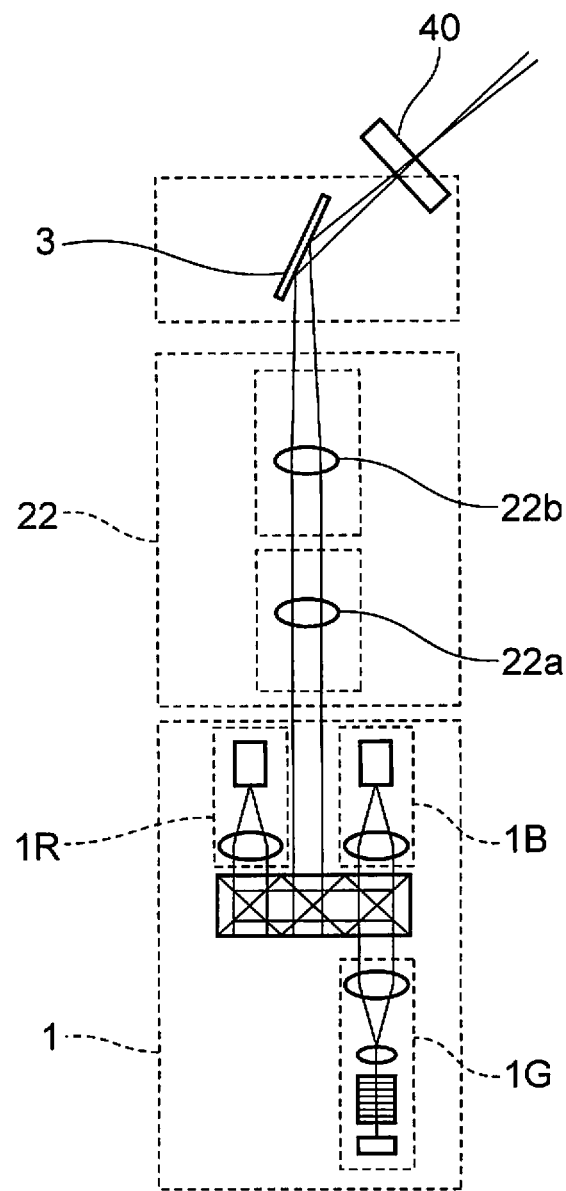
FIG. 15 is an illustrative view showing a constitutional example of the principal parts of a beam scanning display apparatus according to another embodiment of the present invention.

FIG. 15 is a diagram showing the constitution of an eyeglass-type HMD (Head Mounted Display) according to this embodiment. In the second embodiment, a wavefront shape modification unit 22 includes two movable lenses 22a and 22b driven in accordance with an operation of the scanning unit 3. The movable lenses 22a and 22b of the wavefront shape modification unit 22 can be driven by an MEMS, a mechanical actuator, or similar. In other words, in this embodiment, the correction unit for correcting the beam waist position of the scanned beam is constituted by the fixed lens 40 and the movable lenses 22a and 22b. The fixed lens 40 and the movable lenses 22a and 22b adjust the beam waist position of the laser beam in accordance with an operation of the scanning unit 3.

By employing the movable lenses 22a and 22b as the wavefront shape modification unit 22 in this manner, a length of the beam waist position to be adjusted by the fixed lens 40 can be shortened. As a result, the overall curvature of the fixed lens 40 can be reduced, enabling a reduction in the effect of aberration acting on the laser beam.

By thus adjusting the beam waist position of the laser beam in accordance with an operation of the scanning unit 3 using a combination of the fixed lens 40 constituted by a fixed lens and the wavefront shape modification unit 22 including the movable lenses 22a and 22b, the beam waist position of the laser beam scanned by the scanning unit 3 can be adjusted to a more optimum position. Further, by combining the fixed lens 40 with the movable lenses 22a and 22b, high-precision adjustment of the beam waist position can be realized even when the movable lenses 22a and 22b are smaller than conventional movable lenses.

Figure 16:
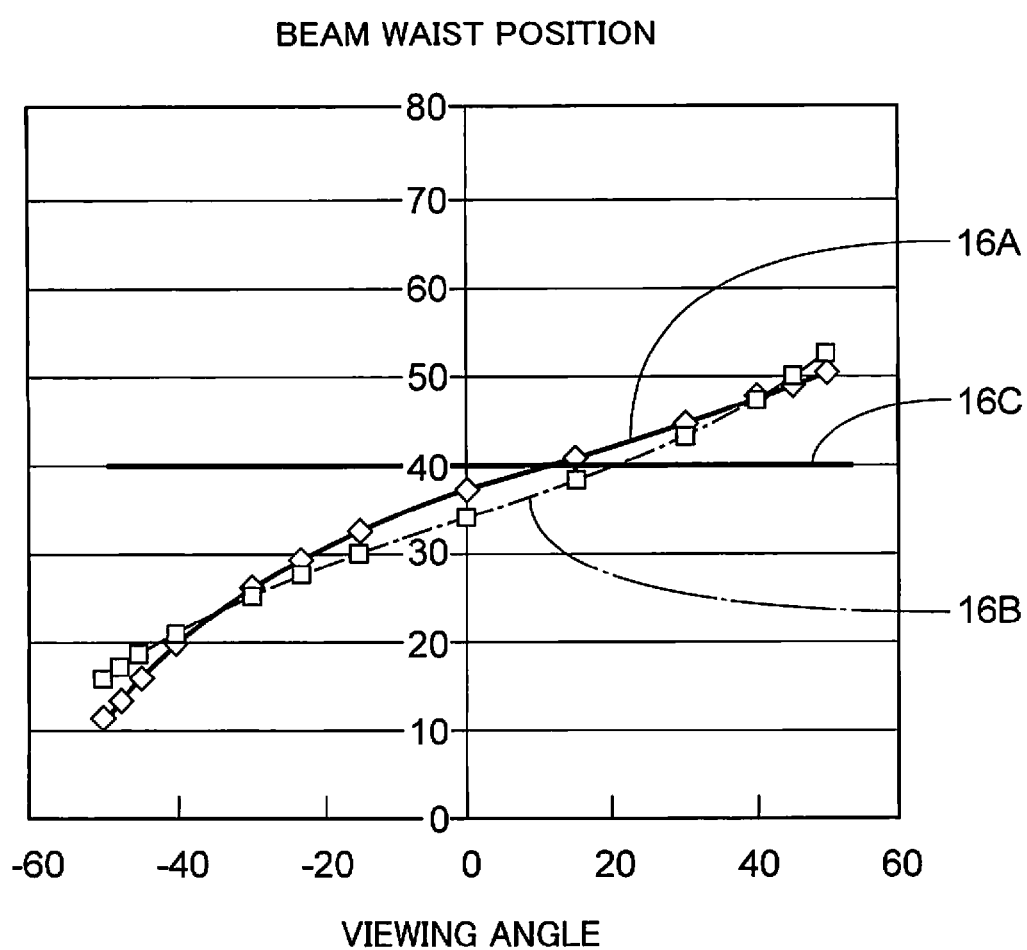
FIG. 16 is a graph showing a beam waist position during simple harmonic driving.

FIG. 16 shows the beam waist position during single vision driving. In FIG. 16, 16A shows an example of variation in the beam waist position in a case where a correction lens is not used and the movable lenses 22a and 22b are subjected to simple harmonic driving in accordance with an operation of the scanning unit 3. FIG. 16 is a relational table showing a relationship between a horizontal direction viewing angle of a pixel drawn by the scanning unit 3 and the beam waist position of the laser beam that draws the pixel, wherein the beam waist position is indicated by a distance from the scanning unit 3. 16A shows an ideal beam waist at which the resolution is optimized. When a pixel of a certain viewing angle is drawn, the resolution is optimized at a point where the beam waist position of the laser beam that draws the pixel is positioned on a line indicated by 16A. 16C shows the beam waist position of the laser beam in a case where the wavefront shape modification unit is constituted by a single lens, as in the first embodiment. In this case, as is evident from 16C, the beam waist position is constant. Hence, with the constitution of the first embodiment, the difference between the beam waist position of 16A and the beam waist position of 16C must be adjusted (reduced) using the fixed lens 40 alone.

In FIG. 16, 16B shows the beam waist position of the laser beam in a case where the movable lenses 22a and 22b constituting the fixed lens 40 are subjected to simply harmonic driving in accordance with the scanning operation of the scanning unit 3.

As is evident when 16B and 16C are respectively compared with the ideal beam waist position 16A, the difference between the beam waist position 16B generated by the movable lenses 22a/22b and the optimum beam waist position 16A is smaller than the difference between the beam waist position 16C obtained when a single lens is used alone and the optimum beam waist position 16A. Hence, an optical power required by the correction lens to bring the beam waist position 16B generated by the movable lenses closer to the optimum beam waist position 16A is smaller than an optical power required to bring the beam waist position 16C generated by the single lens closer to the optimum beam waist position 16A. Therefore, when a free-form surface lens is used as the fixed lens 40, the curvature of the fixed lens 40 can be reduced. As a result, the aberration effect exerted on the laser beam L by the fixed lens 40 can be suppressed.

Furthermore, by using the fixed lens 40 (the correction lens) to optimize the beam waist position in accordance with an operation of the scanning unit 3, as in this embodiment, a distance moved by the movable lenses 22a and 22b can be reduced. As a result, an amount of power required to drive the wavefront shape modification unit 22 can be reduced.

Note that cylindrical lenses respectively having only a horizontal direction curvature and only a vertical direction curvature may be used as the movable lenses 22a and 22b according to this embodiment. In this case, control of the horizontal direction beam waist and control of the vertical direction beam waist can be performed by the respective movable lenses alone. As a result, the optical system can be designed more easily.

Note that the movable lenses 22a and 22b may be constituted by an element exhibiting an optical performance that is varied by electric control, such as a liquid crystal lens or a liquid lens, rather than a lens that actually changes its position. In this case, the need to actually move the movable lenses 22a and 22b is eliminated, and therefore surplus oscillation can be prevented. Further, since space for accommodating the movement of the movable lenses 22a and 22b is not required, a further reduction in the size of the image display apparatus can be realized.

Third Embodiment

Another embodiment of the present invention will be described below with reference to the drawings.

Figure 17:
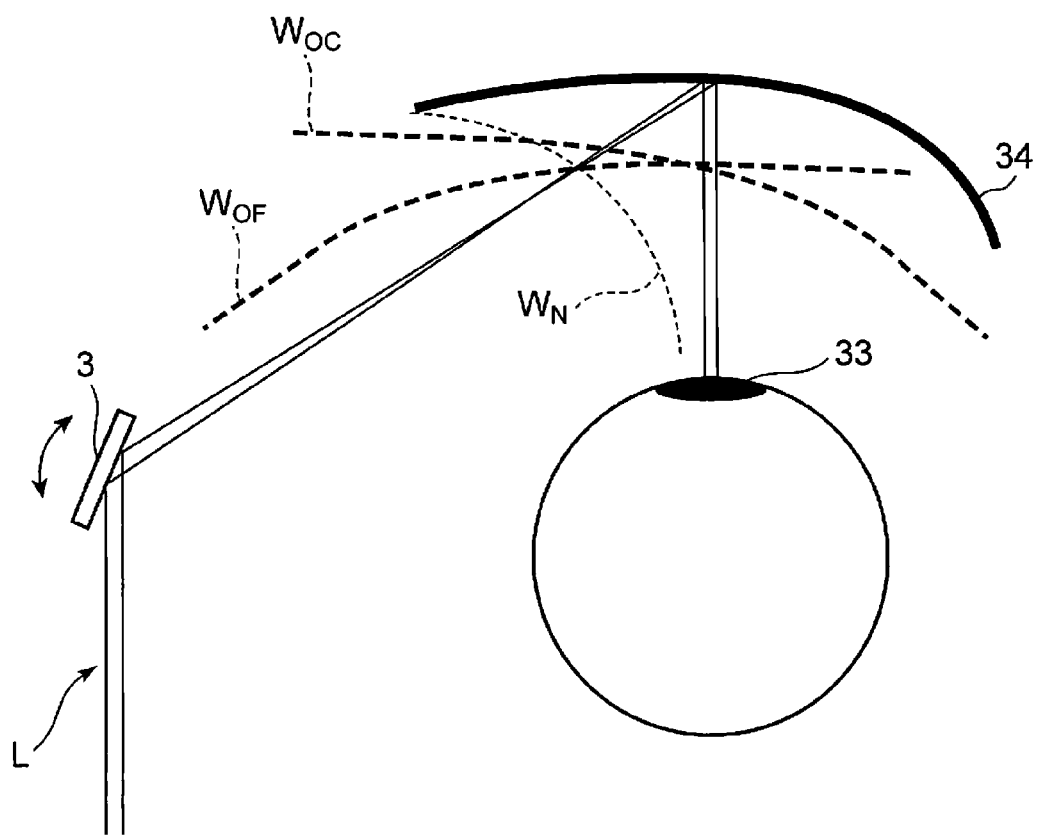
FIG. 17 is an illustrative view showing the principal constitution of an eyeglass-type HMD according to a further embodiment of the present invention.

FIG. 17 shows the constitution of the principal parts of an eyeglass-type HMD (Head Mounted Display) according to a third embodiment. Similar constitutional elements to those of the embodiments described above have been allocated identical member numbers, and description thereof has been omitted where appropriate.

In this embodiment, the ideal beam waist position of the laser beam L for optimizing the resolution can be modified by forming a deflecting unit 34 attached to an eyeglass lens part in a curved shape. In FIG. 17, a trajectory $W_{OF}$ illustrates the ideal beam waist position when the deflecting unit 34 takes a planar shape, while a trajectory $W_{OC}$ illustrates the ideal beam waist position when the deflecting unit 34 takes a curved shape. In FIG. 17, a trajectory $W_N$ illustrates the beam waist position of a laser beam scanned by the scanning unit 3 in a case where the beam waist position is optimized only in relation to laser beams traveling toward the center of the screen. As is evident from FIG. 17, the difference between the ideal beam waist position $W_{OC}$ when the deflecting unit 34 is curved and the beam waist position $W_N$ of the scanned laser beam is smaller. Therefore, by forming the deflecting unit 34 in a curved shape, an improvement in the display resolution can be achieved.

Further, the optical power required by the fixed lens 40 when the beam waist position $W_N$ of the scanned laser beam is corrected by the fixed lens 40 and the wavefront shape modification unit 2 can be reduced. As a result, the aberration effect exerted on the laser beam by the fixed lens 40 can be reduced, enabling an improvement in the resolution.

Fourth Embodiment

A further embodiment of the present invention will be described below with reference to the drawings. Similar constitutional elements to those of the embodiments described above have been allocated identical member numbers, and description thereof has been omitted where appropriate.

In this embodiment, an adjustment unit for adjusting the beam waist is disposed between the scanning unit and the deflecting unit in a case where a HUD (Head Up Display) installed in a vehicle or an aircraft is realized by a beam scanning display apparatus, thereby achieving both an improvement in the image quality of the HUD and a reduction in the size of the optical system.

Figure 18:
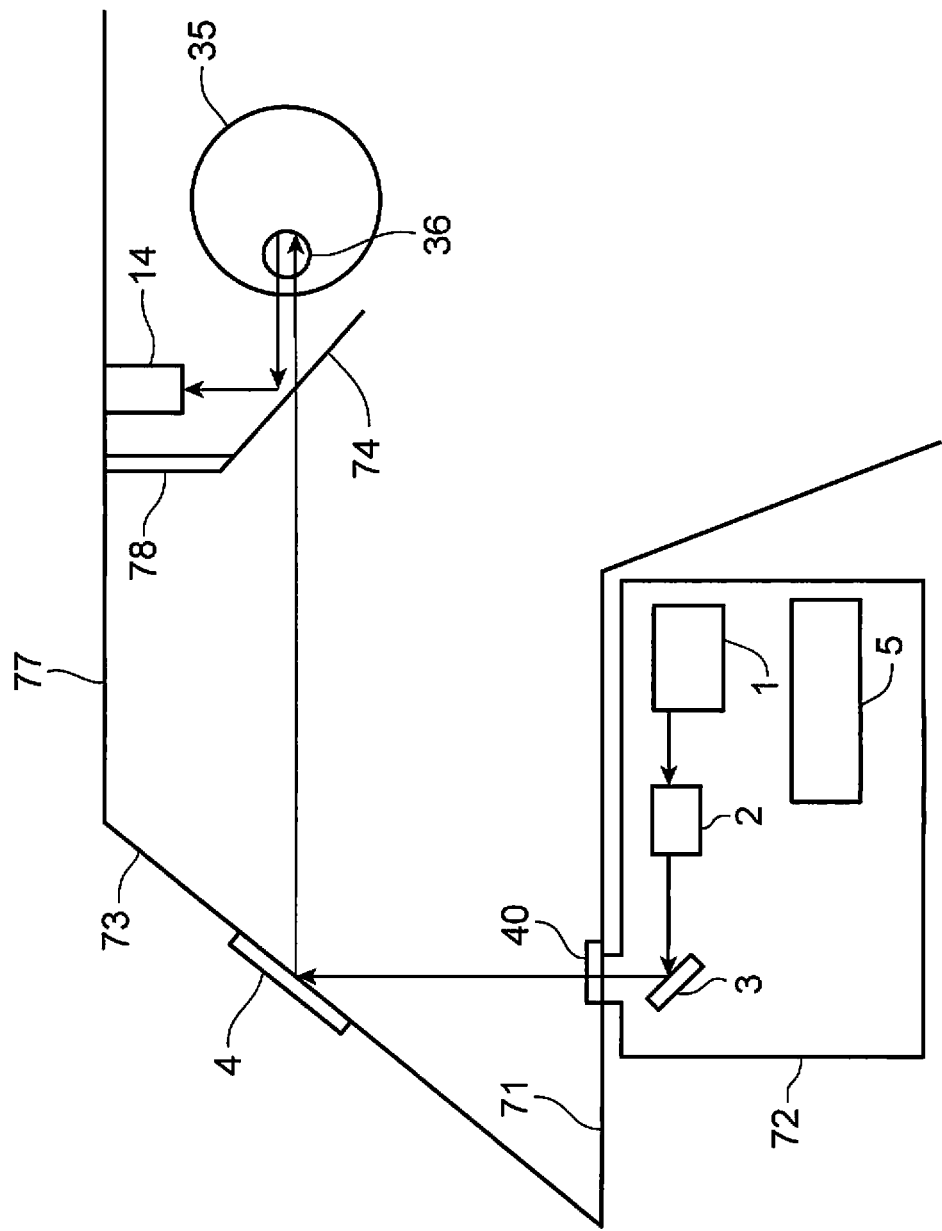
FIG. 18 is a side view of a beam scanning HUD according to a further embodiment of the present invention.
Figure 19:
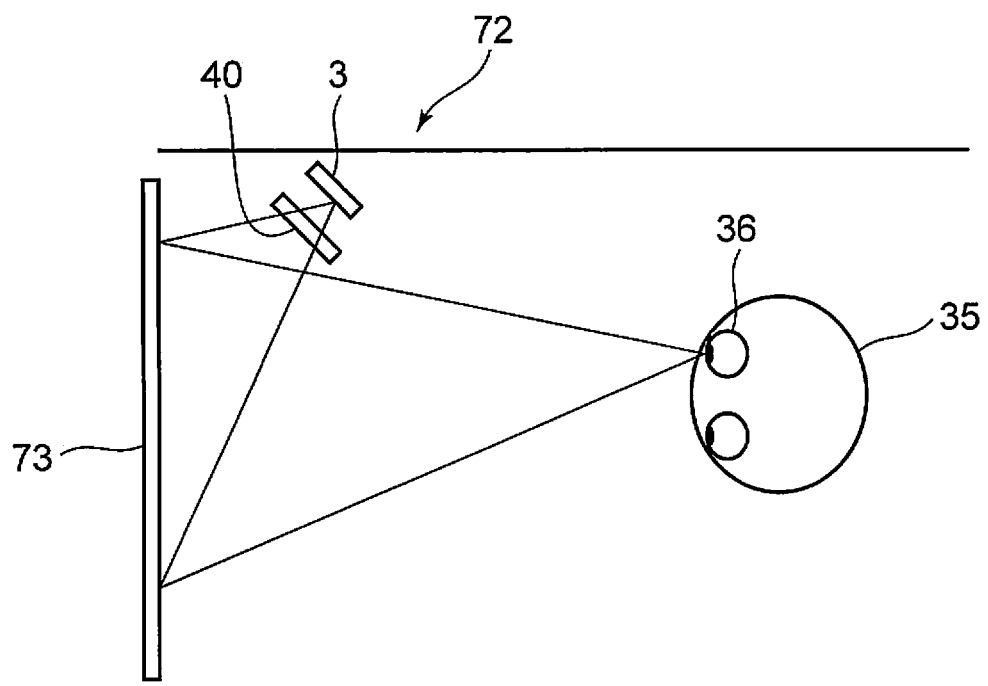
FIG. 19 is a bird's eye view of the beam scanning HUD shown in FIG. 18.

FIG. 18 is a side view of a beam scanning HUD (Head Up Display) according to the fourth embodiment, and FIG. 19 is a bird's eye view thereof.

As shown in FIG. 18, a beam scanning unit 72 is embedded in the interior of a vehicle 71. The beam scanning unit 72 is attached below a windshield 73 of the vehicle. In this embodiment, the beam scanning unit 72 is disposed in the interior of an instrument panel, thereby reducing the space required for the display apparatus.

Note that the beam scanning unit 72 may be disposed on the exterior of the instrument panel (not shown) serving as an in-vehicle instrument part, rather than in the interior of the instrument panel. In this case, replacement and positional modification of the beam scanning unit 72 can be performed easily.

A beam scanned by the beam scanning unit 72 is reflected by the deflecting unit 4 attached to the windshield 73 so as to pass through a half mirror 74, and when the beam reaches an eyeball 36 of a driver 35, an image becomes visible. In the HUD constituted as described above, map information and warning information displayed by the beam scanning unit 72 can be seen while viewing the external landscape through the windshield 73. Hence, improvements in the safety and convenience of the driver can be achieved. The reflected light of the laser projected onto the retina of the user is reflected by the half mirror 74 disposed in front of the eye of the user and detected by a light detection unit 14.

Note that in this embodiment, the beam scanning unit 72 is constituted by the laser light source 1, the wavefront shape modification unit 2, the scanning unit 3, and the control unit 5. As shown in FIG. 19, the beam scanning unit 72 is disposed on a side mirror side of the user rather than in front of the user and therefore projects a laser beam onto the windshield 73 diagonally. With this constitution, the freedom of the arrangement location of the beam scanning unit 72 can be improved, leading to an improvement in the design of the vehicle.

Note that in the above constitution, the deflecting unit 4 may be provided on the windshield 73 detachably. In this case, the deflecting unit 4 can be removed temporarily when display on the windshield 73 is not required, thereby maintaining the transparency of the windshield 73 while improving driver safety.

The deflecting unit 4 may reflect light from the scanning unit 3 toward both eyes of the user rather than one of the left and right eyes. In this case, an image can be displayed on both eyes of the user by the single deflecting unit 4.

Further, in this embodiment, the half mirror 74 is disposed in front of the eye of the user to reflect reflection light from the retina of the user toward the light detection unit 14. The half mirror 74 is attached to a ceiling 77 of the vehicle by a support rod 78, and with this structure, the spot size of the laser beam on the retina of the user can be detected without necessitating attachment of an apparatus to a head portion of the user. Note that the half mirror 74 and the light detection unit 14 may be disposed on eyeglasses or a hat of the driver 35 instead of the vehicle ceiling. In this case, the half mirror is less likely to contact the head of the driver 35 even if the head moves forward and backward, and therefore the safety of the driver 35 can be improved.

The control unit 5 is provided with an integrated circuit for controlling the respective parts of the HUD. The control unit 5 controls the outputs of the respective lasers and operations of the wavefront shape modification unit 2, scanning unit 3, and light detection unit 14.

Further, the wavefront shape modification unit may be constituted by the wavefront shape modification unit 22 including the movable lenses 22a and 22b, as shown in FIG. 15. In this case, the control unit 5 also has a function for controlling an operation of the wavefront shape modification unit 22. When the wavefront shape modification unit 22 is constituted by the movable lenses 22a and 22b, the movable lenses 22a and 22b do not always operate with stability in a highly oscillatory environment such as a vehicle interior, and therefore blurring may occur during an operation. Hence, the light detection unit 14 detects the spot size of the laser beam on the retina of the user, and on the basis of a detection result, the control unit 5 makes minute adjustments to ensure that this blurring does not occur by controlling the operations of the movable lenses 22a and 22b of the wavefront shape modification unit 22. As a result, stability can be achieved in the display quality.

The control unit 5 also has a function for controlling an operation of the wavefront shape modification unit 2. In the constitution shown in FIG. 18, the light detection unit 14 is provided on the ceiling and the control unit 5 is provided in the interior of the instrument panel. In this case, communication between the light detection unit 14 and the control unit 5 can be realized by laying a wire cable connecting the two members in the interior of the vehicle to enable wired communication or providing a communication unit for performing information communication between the two components to enable wireless communication.

In this embodiment, the beam scanning display apparatus of FIG. 18 brings the beam waist position of the laser beam close to an optimum position using the fixed lens 40 provided between the scanning unit 3 and the deflecting unit 4, similarly to the first embodiment. Furthermore, in this embodiment, the beam waist position can be corrected by the fixed lens 40, which is constituted by a fixed lens, without operating an optical system (without subjecting the lens of the wavefront shape modification unit 2 to simple harmonic driving or the like). Hence, the user can be provided with a high-quality image in a highly oscillatory environment such as a vehicle interior.

Note that FIGS. 18 and 19 show only one of the two eyes of the user. However, the beam scanning unit 72, deflecting unit 4, and light detecting unit 14 may be provided in duplicate such that the curvature radius of the beam is controlled in relation to both eyes.

Fifth Embodiment

In this embodiment, a beam scanning display apparatus is used to display information on a screen having a curved shape, such as a dashboard of a vehicle. FIG. 20 is a diagram showing the constitution of the beam scanning display apparatus according to this embodiment. Note that description of constitutional elements that are similar to those of the first embodiment has been omitted.

In this embodiment, a laser beam from the light source 1 is scanned by the scanning unit 3 and then displayed as an image on a screen 80a. At this time, when the beam waist of the laser beam scanned by the scanning unit 3 is located on the screen 80a, a maximum display resolution can be achieved. A dotted line in FIG. 20A indicates the trajectory of a beam waist position $W_N$ in a case where correction is not performed by the fixed lens 40. In this embodiment, the optical performance of the fixed lens 40 is determined such that the beam waist position $W_N$ of the laser beam scanned by the scanning unit 3 matches the curved display surface of the screen 80a.

Figure 20A:
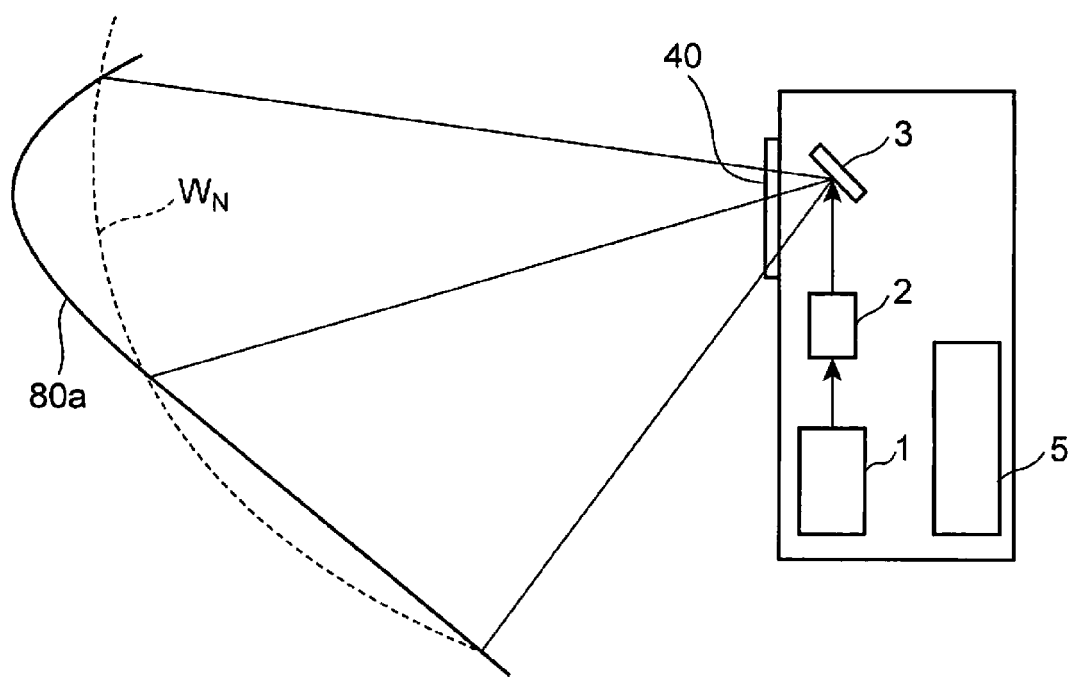
FIG. 20 is an illustrative view showing the constitution of a beam scanning display apparatus according to a further embodiment of the present invention.
Figure 20B:
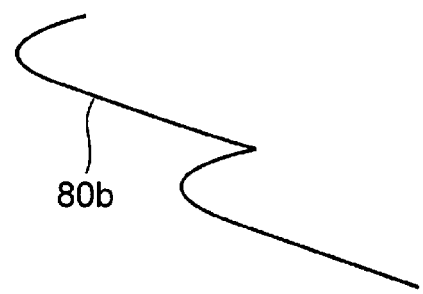

In the constitutional example shown in FIG. 20A, the shape of the fixed lens 40 is determined such that a negative optical power for causing the beam waist position to head away from the scanning unit 3 is exerted on a laser beam for drawing an image in an upper portion of the screen 80a whereas a positive optical power for causing the beam waist position to draw closer to the scanning unit 3 is exerted on a laser beam for drawing an image in a lower portion of the screen 80a.

In the constitution shown in FIG. 20A, the simple curved screen 80a is used as the screen. However, the screen is not limited thereto, and a screen having a plurality of curved surfaces, such as that shown in FIG. 20B, for example, may be used. In this case, the plurality of curved surfaces enable an increase in design freedom, and as a result, the design freedom of the dashboard of the vehicle can be increased. A screen formed from a combination of a flat surface and a curved surface may also be used.

Note that in the above example, a case in which information is displayed on a dashboard of a vehicle was described as a constitution for displaying information on the screen 80a having a curved surface, but this embodiment is not limited thereto. For example, the curved-surface screen need not be limited to the dashboard of a vehicle, and a constitution in which display is performed using a wall surface of a room or the like as the screen may be employed.

Control processing is realized in the respective embodiments described above by having a CPU interpret and execute predetermined program data stored in a storage apparatus (a ROM, a RAM, a hard disk, or the like), with which the processing procedures described above can be executed. In this case, the program data may be introduced into the storage apparatus via a recording medium or executed directly from the recording medium. The recording medium denotes a ROM, a RAM, a semiconductor memory such as a flash memory, a magnetic disk memory such as a flexible disk or a hard disk, an optical disk such as a CD-ROM, a DVD, or a BD, a memory card such as an SD card, and so on. The recording medium also includes a communication medium such as a telephone line or a carrier path.

As described above, a beam scanning display apparatus according to an aspect of the present invention includes: a light source unit for emitting a light beam; a scanning unit for scanning the light beam emitted from the light source unit; a deflecting unit for deflecting a scanned beam scanned by the scanning unit in a direction traveling toward an eye of a user; and a correction unit for correcting a beam waist position of the scanned beam, wherein the correction unit includes a fixed lens that is provided between the scanning unit and the deflecting unit and exhibits a fixed optical performance.

According to this constitution, the light beam emitted from the light source unit is scanned by the scanning unit and then deflected in a direction traveling toward the eye of the user by the deflecting unit. Here, the fixed lens exhibiting a fixed optical performance is provided between the scanning unit and the deflecting unit, and this fixed lens functions as the correction unit for correcting the beam waist position of the scanned beam scanned by the scanning unit.

Hence, the beam waist position of the scanned beam can be modified to an optimum position using the fixed lens, enabling an improvement in the quality of a displayed image. Further, since the beam waist position is corrected by the fixed lens, there is no need to drive a lens, a mirror, or the like, in contrast to the prior art, and therefore a high-quality image can be displayed to the user while achieving a reduction in the size of an optical system.

In the constitution described above, the fixed lens preferably has a free-form surface, and a curvature of the free-form surface preferably differs according to a position in which the scanned beam impinges on the free-form surface such that the scanned beam traveling toward the eye of the user forms a parallel beam.

According to this constitution, the beam waist position is corrected by making the curvature of the free-form surface of the fixed lens different according to the entrance position of the scanned beam such that the scanned beam traveling toward the eye of the user forms a parallel beam, and therefore both an improvement in the image quality and a reduction in the size of the optical system can be achieved without driving a lens or the like.

In the constitution described above, the deflecting unit preferably includes at least two regions constituted by a first region that is relatively close to the scanning unit and a second region that is further from the scanning unit than the first region, and a curvature at a position in which a scanned beam entering the first region impinges on the free-form surface of the fixed lens and a curvature at a position in which a scanned beam entering the second region impinges on the free-form surface of the fixed lens preferably have different positive/negative signs.

According to this constitution, with respect to a relative positional relationship between the deflecting unit and the scanning unit, the deflecting unit includes the first region close to the scanning unit and the second region far from the scanning unit (in the case of an eyeglass-type HMD, for example, the first region and the second region correspond to an ear side region and a nose side region, respectively). By making the positive/negative signs of the curvature at a position in which a scanned beam entering the first region impinges on the free-form surface of the fixed lens and the curvature at a position in which a scanned beam entering the second region impinges on the free-form surface of the fixed lens different, the beam waist position is corrected such that the scanned beam traveling toward the eye of the user forms a parallel beam. Hence, even when the light beam is projected onto the deflecting unit diagonally, as in an eyeglass-type HMD, such that an optimum beam waist position differs greatly according to the position in which the scanned beam enters the deflecting unit, the beam waist position of the scanned beam can be corrected appropriately.

In the constitution described above, the curvature at the position in which the scanned beam entering the first region impinges on the free-form surface of the fixed lens is preferably set such that a convex lens action is exerted on the scanned beam.

According to this constitution, the beam waist position of the scanned beam entering the first region of the deflecting unit, which is close to the scanning unit, can be moved to a position close to the scanning unit by the convex lens action. As a result, the beam waist position of the scanned beam can be corrected to the optimum beam waist position.

In the constitution described above, the fixed lens preferably has a curvature center portion in which a value of the curvature of the free-form surface is zero, and an absolute value of the curvature of the free-form surface of the fixed lens in a first direction is preferably set to increase steadily as a distance in the first direction from the curvature center portion increases.

According to this constitution, the beam waist position can be brought closer to the optimum position even when the optimum beam waist position varies greatly according to the position in which the scanned beam enters the deflecting unit in the first direction (a horizontal direction in an eyeglass-type HMD, for example).

In the constitution described above, the fixed lens is preferably formed such that the absolute value of the curvature in the first direction increases linearly in proportion to an increase in the distance in the first direction from the curvature center portion.

According to this constitution, the fixed lens of the correction unit has a predetermined curvature variation width in the first direction (an amount of curvature variation per unit distance in the first direction), and the absolute value of the curvature of the free-form surface in the first direction increases linearly by an amount corresponding to the value of the curvature variation width every time a fixed distance from the curvature center portion is reached in the first direction. Hence, the shape of the fixed lens can be set such that the first direction curvature of the free-form surface varies by a fixed ratio, and as a result, the fixed lens can be designed and manufactured easily.

In the constitution described above, an absolute value variation width of the curvature in the first direction within a region in which the scanned beam entering the first region impinges on the free-form surface of the fixed lens is preferably larger than an absolute value variation width of the curvature in the first direction within a region in which the scanned beam entering the second region impinges on the free-form surface of the fixed lens.

According to this constitution, variation in the optimum beam waist position can correspond to a case in which a scanned beam traveling toward the first region of the deflecting portion (an ear side region in an eyeglass-type HMD, for example) is larger than a scanned beam traveling toward the second region of the deflecting portion (a nose side region in an eyeglass-type HMD, for example).

In the constitution described above, the fixed lens is preferably formed such that an absolute value of a curvature in a second direction that intersects the first direction decreases linearly in proportion to an increase in a distance in the second direction from the curvature center portion.

According to this constitution, the fixed lens of the correction unit has a predetermined curvature variation width in the second direction (an amount of curvature variation per unit distance in the second direction, wherein the second direction is a vertical direction in an eyeglass-type HMD, for example), and the absolute value of the curvature of the free-form surface in the second direction decreases linearly by an amount corresponding to the value of the curvature variation width every time a fixed distance from the curvature center portion is reached in the second direction. Hence, the shape of the fixed lens can be set such that the second direction curvature of the free-form surface varies by a fixed ratio, and as a result, the fixed lens can be designed and manufactured easily. Furthermore, when the scanned beam is scanned in the second direction, the effect of aberration received from the fixed lens can be suppressed.

In the constitution described above, the fixed lens preferably includes an entrance surface on which the scanned beam enters and an exit surface from which the scanned beam exits, and the free-form surface of the fixed lens is preferably formed only on the exit surface.

According to this constitution, the free-form surface of the fixed lens is formed on the exit surface rather than the entrance surface, and therefore a surface area of the free-form surface on which the scanned beam impinges can be enlarged. As a result, an appropriate curvature corresponding to a scanning angle of the scanned beam can be set easily on the free-form surface of the fixed lens.

The constitution described above preferably further includes at least one folding mirror provided on an optical path extending from the light source unit to the fixed lens, wherein the folding mirror is preferably disposed such that an optical path distance from a point at which the scanned beam is scanned by the scanning unit to a point at which the scanned beam enters the correction unit is longer than an interval distance between the scanning unit and the correction unit.

According to this constitution, the optical path distance extending from the point at which the scanned beam is scanned by the scanning unit to the point at which the scanned beam enters the correction unit is increased by the folding mirror, and therefore the surface area of the free-form surface on which the scanned beam impinges can be enlarged. As a result, an appropriate curvature corresponding to the scanning angle of the scanned beam can be set easily on the free-form surface of the fixed lens.

The constitution described above preferably further includes an aberration correction lens provided between the scanning unit and the light source unit, wherein the aberration correction lens preferably includes a free-form surface having a curvature with an opposite positive/negative sign to the free-form surface of the fixed lens.

According to this constitution, the effect of aberration generated by the fixed lens can be suppressed by the aberration correction lens provided between the scanning unit and the light source unit, and therefore coma aberration can be corrected easily. As a result, a further improvement in the image quality of the image displayed to the user can be achieved.

The fixed lens preferably includes a first fixed lens having a first free-form surface oriented in a first direction and a second fixed lens having a second free-form surface oriented in a second direction that intersects the first direction, and respective curvatures of the first free-form surface and the second free-form surface preferably differ according to an entrance position of the scanned beam such that the scanned beam traveling toward the eye of the user forms a parallel beam.

According to this constitution, the first fixed lens having the first free-form surface oriented in the first direction and the second fixed lens having the second free-form surface oriented in the second direction can be designed and manufactured separately. As a result, the fixed lens can be designed and manufactured easily.

In the constitution described above, the correction unit preferably further includes at least one movable lens that is provided between the scanning unit and the light source unit and exhibits a variable optical performance.

According to this constitution, the correction unit for correcting the beam waist position of the scanned beam includes a fixed lens and a movable lens. Therefore, the beam waist position of the scanned beam can be modified more precisely using not only the fixed lens but also the movable lens. As a result, improvements in the precision with which the beam waist position of the scanned beam is adjusted and the quality of the displayed image can be achieved. Further, by combining the fixed lens and the movable lens, the amount by which the beam waist position is adjusted by the fixed lens can be reduced. Therefore, the overall curvature of the fixed lens can be reduced, leading to a reduction in the effect of aberration acting on the light beam. Furthermore, by combining the fixed lens and the movable lens, high-precision adjustment of the beam waist position can be realized even when the movable lens is smaller than a conventional movable lens.

In the constitution described above, a position of the movable lens is preferably modified in accordance with an operation of the scanning unit such that the beam waist position of the scanned beam approaches an ideal beam waist position for making the scanned beam traveling toward the eye of the user into a parallel beam.

According to this constitution, a position variable movable lens is used such that the position of the movable lens can be modified, and therefore the beam waist position can be modified easily in accordance with an operation of the scanning unit.

In the constitution described above, the movable lens is preferably a liquid crystal element, an optical performance of which is modified electrically in accordance with an operation of the scanning unit such that the beam waist position of the scanned beam approaches an ideal beam waist position for making the scanned beam traveling toward the eye of the user into a parallel beam.

According to this constitution, a liquid crystal element, the optical performance of which is modified electrically, is used as the movable lens. Hence, a mechanism for actually modifying the position of the movable lens is not required, and therefore the size of the display apparatus can be reduced and excess oscillation can be suppressed.

In the constitution described above, the fixed lens preferably has a curved surface shape for correcting a difference between the beam waist position of the scanned beam modified by the movable lens and the ideal beam waist position such that the scanned beam traveling toward the eye of the user forms a parallel beam.

According to this constitution, the beam waist position of the scanned beam is corrected by the movable lens and a part of the beam waist position that could not be fully corrected by the movable lens is corrected by the fixed lens. As a result, the beam waist position of the scanned beam can be brought closer to the ideal beam waist position more accurately.

In the constitution described above, the deflecting unit preferably has a curved surface shape.

According to this constitution, by forming the deflecting unit with a curved surface shape, the ideal beam waist position for forming the scanned beam traveling toward the eye of the user into a parallel beam can be brought closer to the beam waist position of the actual scanned beam, and therefore the quality of the image provided to the user can be improved even further.

A beam scanning display apparatus according to another aspect of the present invention is a beam scanning display apparatus for displaying information on a screen by scanning an optical beam, including: a light source unit for emitting a light beam; a scanning unit for scanning the light beam emitted from the light source unit toward the screen; and a correction unit for correcting a beam waist position of the scanned beam scanned by the scanning unit such that the beam waist position approaches a display surface of the screen, wherein the correction unit includes a fixed lens that is provided in a position through which the scanned beam scanned by the scanning unit passes, and exhibits a fixed optical performance.

According to this constitution, a light beam emitted from the light source unit is scanned by the scanning unit and then emitted onto the screen via the fixed lens. Here, the fixed lens functions as the correction unit for correcting the beam waist position of the scanned beam scanned by the scanning unit.

Hence, the beam waist position of the scanned beam can be modified by the fixed lens in accordance with the display surface of the screen, enabling an improvement in the quality of the displayed image. Further, since the beam waist position is corrected by the fixed lens, the need to drive a lens, a mirror, or the like, as in the prior art, can be eliminated, and therefore a high-quality image can be displayed on screens of various shapes while achieving a reduction in the size of the optical system.

Note that specific embodiments or examples described in the Embodiments of the Invention section are merely employed to clarify the technical content of the present invention. The present invention is not to be interpreted in a narrow sense as being limited only to these specific examples, and may be implemented after undergoing various modifications within the scope of the spirit of the present invention and the claims to be described below.

INDUSTRIAL APPLICABILITY

The beam scanning display apparatus according to the present invention may also be employed in an application having correcting means for correcting a beam waist position or the like, such as a display apparatus, a display system, a display method, or a display program.

The invention claimed is:

1. A beam scanning display apparatus comprising:
a light source unit for emitting a light beam;
a scanning unit for scanning the light beam emitted from the light source unit;
a deflecting unit for deflecting a scanned beam scanned by the scanning unit in a direction traveling toward an eye of a user; and
a correction unit for correcting a beam waist position of the scanned beam,
wherein the correction unit includes a fixed lens that is provided between the scanning unit and the deflecting unit and exhibits a fixed optical performance.

2. The beam scanning display apparatus according to claim 1, wherein the fixed lens has a free-form surface, and a curvature of the free-form surface differs according to a position in which the scanned beam impinges on the free-form surface such that the scanned beam traveling toward the eye of the user forms a parallel beam.

3. The beam scanning display apparatus according to claim 2, wherein the deflecting unit includes at least two regions constituted by a first region that is relatively close to the scanning unit and a second region that is further from the scanning unit than the first region, and
a curvature at a position in which a scanned beam entering the first region impinges on the free-form surface of the fixed lens and a curvature at a position in which a scanned beam entering the second region impinges on the free-form surface of the fixed lens have different positive/negative signs.

4. The beam scanning display apparatus according to claim 3, wherein the curvature at the position in which the scanned beam entering the first region impinges on the free-form surface of the fixed lens is set such that a convex lens action is exerted on the scanned beam.

5. The beam scanning display apparatus according to claim 4, wherein the fixed lens has a curvature center portion in which a value of the curvature of the free-form surface is zero, and
an absolute value of the curvature of the free-form surface of the fixed lens in a first direction is set to increase steadily as a distance in the first direction from the curvature center portion increases.

6. The beam scanning display apparatus according to claim 5, wherein the fixed lens is formed such that the absolute value of the curvature in the first direction increases linearly in proportion to an increase in the distance in the first direction from the curvature center portion.

7. The beam scanning display apparatus according to claim 6, wherein an absolute value variation width of the curvature in the first direction within a region in which the scanned beam entering the first region impinges on the free-form surface of the fixed lens is larger than an absolute value variation width of the curvature in the first direction within a region in which the scanned beam entering the second region impinges on the free-form surface of the fixed lens.

8. The beam scanning display apparatus according to claim 7, wherein the fixed lens is formed such that an absolute value of a curvature in a second direction that intersects the first direction decreases linearly in proportion to an increase in a distance in the second direction from the curvature center portion.

9. The beam scanning display apparatus according to claim 1, wherein the fixed lens includes an entrance surface on which the scanned beam enters and an exit surface from which the scanned beam exits, and
the free-form surface of the fixed lens is formed only on the exit surface.

10. The beam scanning display apparatus according to claim 1, further comprising at least one folding mirror provided on an optical path extending from the light source unit to the fixed lens,
wherein the folding mirror is disposed such that an optical path distance from a point at which the scanned beam is scanned by the scanning unit to a point at which the scanned beam enters the correction unit is longer than an interval distance between the scanning unit and the correction unit.

11. The beam scanning display apparatus according to claim 8, further comprising an aberration correction lens provided between the scanning unit and the light source unit,
wherein the aberration correction lens includes a free-form surface having a curvature with an opposite positive/negative sign to the free-form surface of the fixed lens.

12. The beam scanning display apparatus according to claim 2, wherein the fixed lens includes a first fixed lens having a first free-form surface oriented in a first direction and a second fixed lens having a second free-form surface oriented in a second direction that intersects the first direction, and
respective curvatures of the first free-form surface and the second free-form surface differ according to an entrance position of the scanned beam such that the scanned beam traveling toward the eye of the user forms a parallel beam.

13. The beam scanning display apparatus according to claim 1, wherein the correction unit further comprises at least one movable lens that is provided between the scanning unit and the light source unit and exhibits a variable optical performance.

14. The beam scanning display apparatus according to claim 13, wherein a position of the movable lens is modified in accordance with an operation of the scanning unit such that the beam waist position of the scanned beam approaches an ideal beam waist position for making the scanned beam traveling toward the eye of the user into a parallel beam.

15. The beam scanning display apparatus according to claim 13, wherein the movable lens is a liquid crystal element, an optical performance of which is modified electrically in accordance with an operation of the scanning unit such that the beam waist position of the scanned beam approaches an ideal beam waist position for making the scanned beam traveling toward the eye of the user into a parallel beam.

16. The beam scanning display apparatus according to claim 14, wherein the fixed lens has a curved surface shape for correcting a difference between the beam waist position of the scanned beam modified by the movable lens and the ideal beam waist position such that the scanned beam traveling toward the eye of the user forms a parallel beam.

17. The beam scanning display apparatus according to claim 1, wherein the deflecting unit has a curved surface shape.

* * * * *